US009974065B2

(12) United States Patent
Gorokhov et al.

(10) Patent No.: US 9,974,065 B2
(45) Date of Patent: May 15, 2018

(54) DYNAMIC CONTROL BLANKING IN HETEROGENEOUS NETWORKS

(75) Inventors: Alexei Y. Gorokhov, San Diego, CA (US); Ravi Palanki, San Diego, CA (US); Aamod D. Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 994 days.

(21) Appl. No.: 12/484,624

(22) Filed: Jun. 15, 2009

(65) Prior Publication Data

US 2010/0151873 A1    Jun. 17, 2010

Related U.S. Application Data

(60) Provisional application No. 61/075,648, filed on Jun. 25, 2008.

(51) Int. Cl.
*H04W 28/04* (2009.01)
*H04W 72/04* (2009.01)
(Continued)

(52) U.S. Cl.
CPC .......... *H04W 72/042* (2013.01); *H04W 16/14* (2013.01); *H04W 72/0426* (2013.01); *H04W 72/082* (2013.01)

(58) Field of Classification Search
CPC .............................. H04W 28/048; H04W 40/16
(Continued)

(56) References Cited

U.S. PATENT DOCUMENTS

2005/0105504 A1    5/2005  Sakoda
2005/0240985 A1    10/2005 Alkove et al.
(Continued)

FOREIGN PATENT DOCUMENTS

JP    2005012683 A    1/2005
JP    2006515141 A    5/2006
(Continued)

OTHER PUBLICATIONS

International Search Report and Written Opinion—PCT/US2009/048723, International Search Authority—European Patent Office—dated Dec. 18, 2009.
(Continued)

*Primary Examiner* — Brandon Renner
(74) *Attorney, Agent, or Firm* — Holland & Hart, LLP

(57) ABSTRACT

Systems and methodologies are described that facilitate requesting blanking over control resources from one or more interfering eNBs or devices. An eNB, such as a macrocell, femtocell or picocell eNB, can transmit a downlink control blanking message to a UE directing the UE to perform blanking (e.g., for uplink control resources) or request the blanking from the interfering eNBs or devices (e.g., for downlink control resources). The downlink control blanking message can specify the desired control resources and/or information to determine the control resources. Thus, dynamic control blanking is provided such that blanking is requested to mitigate interference over control resources for the small scale eNB. The small scale eNB can subsequently communicate control data to the UE over the control resources; the control data can include a resource blanking message that similarly directs the UE to request blanking of general data resource from the interfering eNBs or devices.

101 Claims, 17 Drawing Sheets

(51) Int. Cl.
*H04W 16/14* (2009.01)
*H04W 72/08* (2009.01)

(58) Field of Classification Search
USPC .......................................... 370/329
See application file for complete search history.

(56) References Cited

U.S. PATENT DOCUMENTS

| | | | |
|---|---|---|---|
| 2005/0254555 A1* | 11/2005 | Teague ........................ | 375/136 |
| 2006/0291393 A1* | 12/2006 | Teague et al. ................ | 370/235 |
| 2007/0053282 A1* | 3/2007 | Tong et al. ................... | 370/208 |
| 2007/0060057 A1* | 3/2007 | Matsuo et al. .............. | 455/63.1 |
| 2007/0082619 A1* | 4/2007 | Zhang et al. ................. | 455/69 |
| 2010/0296459 A1* | 11/2010 | Miki et al. ................... | 370/329 |

FOREIGN PATENT DOCUMENTS

| | | | |
|---|---|---|---|
| JP | 2008017325 A | | 1/2008 |
| JP | 2009510803 A | | 3/2009 |
| RU | 2005120671 A | | 4/2006 |
| WO | 2004071021 A1 | | 8/2004 |
| WO | WO-2004086636 A2 | | 10/2004 |
| WO | WO-2005117283 A2 | | 12/2005 |
| WO | WO2006007318 A1 | | 1/2006 |
| WO | 2006133415 A2 | | 12/2006 |
| WO | WO-2006138379 A2 | | 12/2006 |
| WO | WO2007024895 A2 | | 3/2007 |
| WO | WO2007044281 | | 4/2007 |

OTHER PUBLICATIONS

Taiwan Search Report—TW098121427—TIPO—dated Nov. 21, 2013.

* cited by examiner

DYNAMIC CONTROL BLANKING IN HETEROGENEOUS NETWORKS

CLAIM OF PRIORITY UNDER 35 U.S.C. § 119

The present Application for Patent claims priority to Provisional Application No. 61/075,648 entitled "SYSTEMS AND METHODS FOR DYNAMIC CONTROL BLANKING IN HETEROGENEOUS NETWORKS" filed Jun. 25, 2008, and assigned to the assignee hereof and hereby expressly incorporated by reference herein.

BACKGROUND

Field

The following description relates generally to wireless communications, and more particularly to blanking control resources in heterogeneous network deployments.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ...). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple user equipment (UE). Each UE may communicate with one or more evolved Node B (eNB) (e.g., base stations) via transmissions on downlinks and uplinks. The downlink refers to the communication link from eNBs to UEs, and the uplink refers to the communication link from UEs to eNBs. Further, communications between UEs and eNBs may be established via single-input single-output (SISO) systems, multiple-input single-output (MISO) systems, multiple-input multiple-output (MIMO) systems, and so forth. In addition, UEs can communicate with other UEs (and/or eNBs with other eNBs) in peer-to-peer wireless network configurations.

In heterogeneous network deployments, small scale eNBs, such as picocell or femtocell eNBs, can provide wireless network access within proximity of one or more macrocell eNBs (e.g., in a sector of the macrocell eNB). This can cause substantial interference to the small scale eNB when trying to communicate during macrocell eNB transmission. In addition, UEs communicating with the macrocell eNB can similarly cause interference to the small scale eNBs. In this regard, resource blanking messages can be sent to the macrocell eNB and/or interfering UEs over a control channel to request resource blanking from the macrocell eNB and/or UE over a set of data resources.

Resource blanking refers to refraining from conventional transmission over a set of resources. For example, this can include hard silencing where a transmitter can cease transmission during or over the resources. This can also include, however, soft power reduction in combination with beam steering (e.g., forming a spatial null towards the device being interfered). Thus, when the macrocell eNB blanks over resources, small scale eNBs can communicate over the resources to provide wireless network access to one or more devices without interference from the macrocell eNB. The control channels over which resource blanking requests are sent, however, can also be utilized by macrocell eNBs, UEs, and small scale eNBs. Thus, control channels can exhibit similar interference among the devices and eNBs, and the resource blanking request may itself be interfered.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating dynamic control resource allocation among devices and evolved Node Bs (eNB) in a heterogeneous wireless network to prevent interference among the devices and eNBs. In particular, a small scale eNB can solicit user equipment (UE) to transmit a control resource blanking message to a macrocell eNB and/or interfering UE by sending a downlink control blanking message. The small scale eNB can utilize a low reuse channel, diversity scheme, or similar strategy to ensure the message is received by the UE. Upon receiving the message, the UE can generate a request for blanking and transmit the request to the interfering macrocell eNB and/or UE. Upon receiving the request, the macrocell eNB and/or interfering UE can blank the indicated control resources allowing the small scale eNB to utilize the control resources in communicating with the UE and/or one or more disparate devices. Thus, for example, the small scale eNB can transmit blanking requests for data resources over the control channels without interference.

According to related aspects, a method is provided that includes transmitting a control blanking request for blanking a set of control resources to one or more interfering devices. The method also includes communicating control information with a disparate device over the set of control resources.

Another aspect relates to a wireless communications apparatus. The wireless communications apparatus can include at least one processor configured to send a control blanking request to blank a set of control resources to one or more interfering devices and transmit control information over the set of control resources to a disparate device. The wireless communications apparatus also comprises a memory coupled to the at least one processor.

Yet another aspect relates to an apparatus that includes means for sending a control blanking request for blanking a set of control resources to one or more interfering devices. The apparatus further includes means for communicating control information with a disparate device over the set of control resources.

Still another aspect relates to a computer program product, which can have a computer-readable medium including code for causing at least one computer to transmit a control blanking request for blanking a set of control resources to one or more interfering devices. Moreover, the computer-readable medium can comprise code for causing the at least one computer to communicate control information with a disparate device over the set of control resources.

Moreover, an additional aspect relates to an apparatus. The apparatus can include a control blanking request component that sends a control blanking request for blanking a set of control resources to one or more interfering devices. The apparatus further includes a control communication component that transmits or receives control information with a disparate device over the set of control resources.

According to other aspects, a method is provided that includes receiving a downlink control blanking request requesting blanking of a set of control resources. The method also includes locally blanking over at least a portion of the set of control resources, wherein the set of control resources are uplink control resources.

Another aspect relates to a wireless communications apparatus. The wireless communications apparatus can include at least one processor configured to obtain a control blanking request related to blanking one or more control resources on one or more interfering devices or eNBs. The at least one processor is further configured to blank over the one or more control resources where the one or more control resources are uplink control resources. The wireless communications apparatus also comprises a memory coupled to the at least one processor.

Yet another aspect relates to an apparatus that includes means for receiving a downlink control blanking request indicating a set of control resources to be blanked. The apparatus further includes means for locally blanking the set of control resources where the set of control resources are uplink control resources.

Still another aspect relates to a computer program product, which can have a computer-readable medium including code for causing at least one computer to receive a downlink control blanking request specifying blanking of a set of control resources. Moreover, the computer-readable medium can comprise code for causing the at least one computer to locally blank over at least a portion of the set of control resources, wherein the set of control resources are uplink control resources.

Moreover, an additional aspect relates to an apparatus. The apparatus can include a message receiving component that obtains a downlink control blanking request indicating a set of control resources to be blanked. The apparatus further includes a control blanking component that locally blanks the set of control resources where the set of control resources are uplink control resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
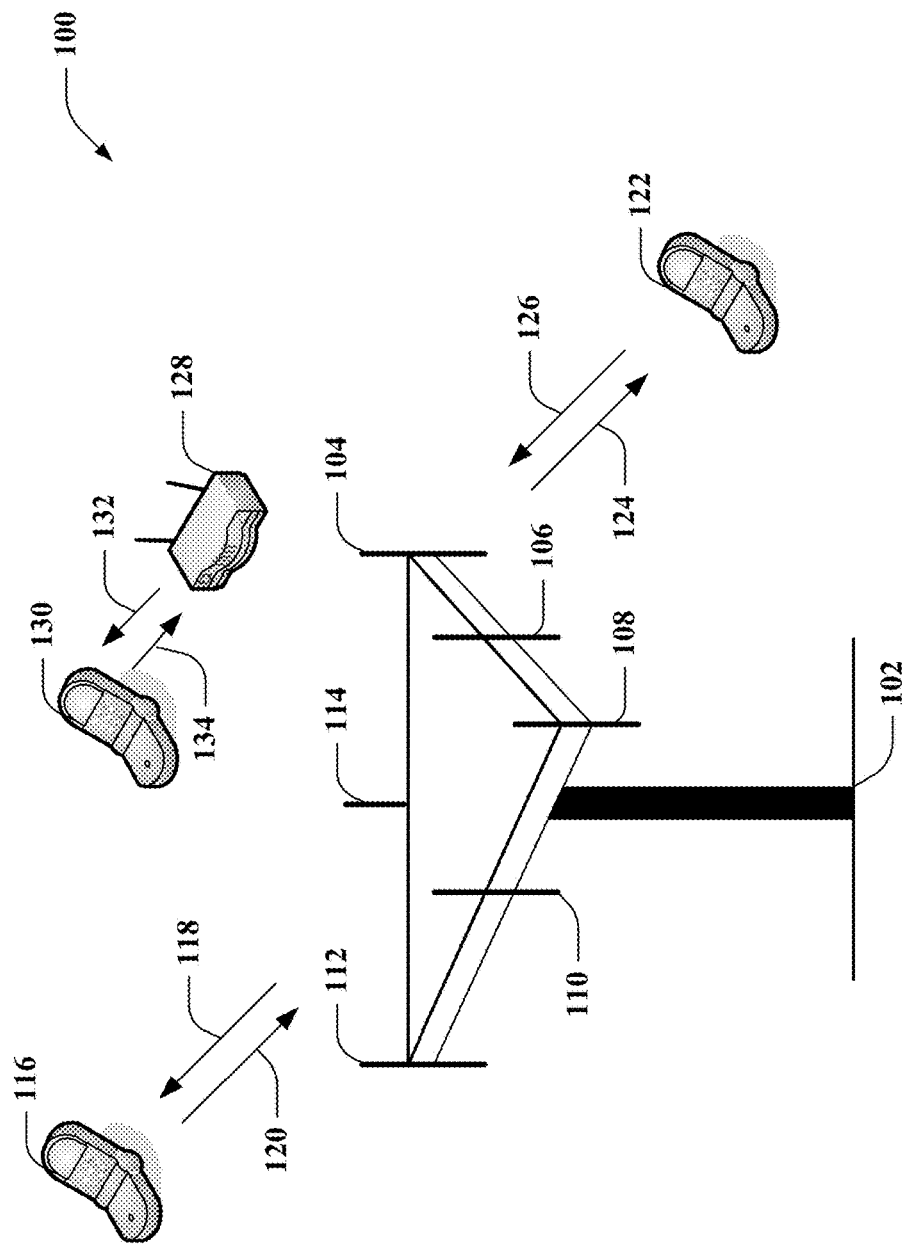
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on at least one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises an eNB 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. eNB 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

eNB 102 can communicate with one or more UEs such as UE 116 and UE 122; however, it is to be appreciated that eNB 102 can communicate with substantially any number of UEs similar to UEs 116 and 122. UEs 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, UE 116 is in communication with antennas 112 and 114, where antennas 112 and 114 transmit information to UE 116 over a downlink 118 and receive information from UE 116 over an uplink 120. Moreover, UE 122 is in communication with antennas 104 and 106, where antennas 104 and 106 transmit information to UE 122 over a downlink 124 and receive information from UE 122 over an uplink 126. In a frequency division duplex (FDD) system, downlink 118 can utilize a different frequency band than that used by uplink 120, and downlink 124 can employ a different frequency band than that employed by uplink 126, for example. Further, in a time division duplex (TDD) system, downlink 118 and uplink 120 can utilize a common frequency band and downlink 124 and uplink 126 can utilize a common frequency band.

Each group of antennas and/or the area in which they are designated to communicate can be referred to as a sector of eNB 102. For example, antenna groups can be designed to communicate to UEs in a sector of the areas covered by eNB 102. In communication over downlinks 118 and 124, the transmitting antennas of eNB 102 can utilize beamforming to improve signal-to-noise ratio of downlinks 118 and 124 for UEs 116 and 122. Also, while eNB 102 utilizes beamforming to transmit to UEs 116 and 122 scattered randomly through an associated coverage, UEs in neighboring cells can be subject to less interference as compared to an eNB transmitting through a single antenna to all its UEs. Moreover, UEs 116 and 122 can communicate directly with one another using a peer-to-peer or ad hoc technology (not shown).

According to an example, system 100 can be a multiple-input multiple-output (MIMO) communication system. Further, system 100 can utilize substantially any type of duplexing technique to divide communication channels (e.g., downlink, uplink, . . . ) such as FDD, FDM, TDD, TDM, CDM, and the like. In addition, communication channels can be orthogonalized to allow simultaneous communication with multiple devices or UEs over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The eNB 102 can communicate to the UEs 116 and 122 over the channels, which can be created for various types of data. For example, channels can be created for communicating various types of general communication data, control data (e.g., quality information for other channels, acknowledgement indicators for data received over channels, interference information, reference signals, etc.), and/or the like.

In one example, the eNB 102 can be a macrocell eNB, and a small scale eNB 128 is provided, which can be a femtocell eNB, picocell eNB, relay node, and/or the like. In one example, the small scale eNB 128 can communicate with UEs using similar technology to that of the eNB 102. For example, the small scale eNB 128 can define channels over radio communication as well and can transmit to one or more UEs, such as UE 130, over a downlink 132 while receiving over an uplink 134. In communicating with the UE 130, the small scale eNB 128 can experience interference over resources utilized by the eNB 102 and/or UE 116, for example. In this regard, the small scale eNB 128 can request that the eNB 102 and/or UE 116 blank certain data resources to facilitate non-interfered communications with the UE 130. For example, the small scale eNB can transmit a downlink resource blanking message to the UE 130 over a control channel requesting the UE 130 to transmit an uplink resource blanking request to eNB 102 and/or UE 116. The small scale eNB 128 can communicate with UE 130 over the blanked data resources.

The control channel over which the small scale eNB 128 transmits the downlink resource blanking message to the UE 130 can potentially be interfered by the eNB 102 and/or UE 116 as well. Thus, the small scale eNB 128 can implement dynamic control channel allocation by requesting that the eNB 102 and/or UE 116 blank over certain control resources. The small scale eNB 128 can, for example, send a downlink control blanking message to the UE 130 to request the blanking. The eNB 128 can transmit the message as a unicast, multicast, or broadcast message, for example. The UE 130 can accordingly request blanking over the control resources from eNB 102 and/or UE 116 by transmitting an uplink control blanking request, which can similarly be a unicast, multicast, or broadcast message. For instance, where the request is a broadcast message, in one example, multiple devices receiving the message can blank over the control data resources. Once blanked, for example, the small scale eNB 128 can transmit the resource blanking message to the UE 130, as described, allowing the UE 130 to request blanking over indicated general data resources. To prevent interference for the control blanking message, the small scale eNB 128 can, in one example, transmit the message over a low reuse control channel, using a diversity scheme, and/or the like.

Figure 2:
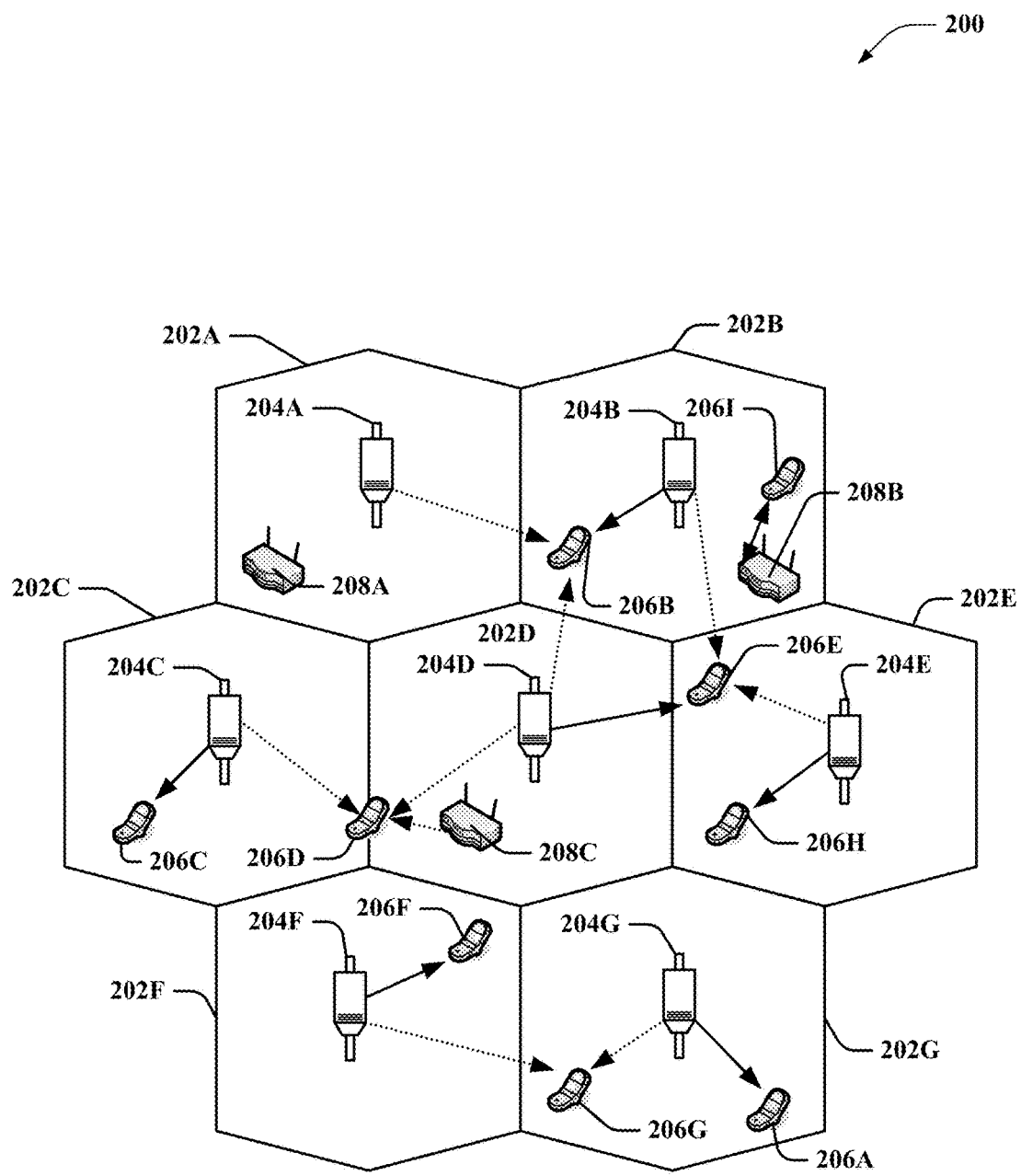
FIG. 2 is an illustration of a wireless communication network in accordance with aspects described herein.

Now referring to FIG. 2, a wireless communication system 200 configured to support a number of UEs is illustrated. The system 200 provides communication for multiple cells, such as for example, macrocells 202A-202G, with each cell being serviced by a corresponding eNB 204A-204G. As described previously, for instance, the eNBs 204A-204G related to the macrocells 202A-202G can be base stations or other access points. UEs 206A-206I are shown dispersed at various locations throughout the wireless communication system 200. Each UE 206A-206I can communicate with one or more eNBs 204A-204G on a downlink and/or an uplink, as described. In addition, eNBs 208A-208C are shown. These can be small scale eNBs, such as femtocell eNBs, picocell eNBs, relay nodes, mobile base stations, and/or the like, offering services related to a particular service location, as described. The UEs 206A-206I can additionally or alternatively communicate with these small scale eNBs 208A-208C to receive offered services. The wireless communication system 200 can provide service over a large geographic region, in one example (e.g., macrocells 202A-202G can cover a few blocks in a neighborhood, and the small scale eNBs 208A-208C can be present in areas such as residences, office buildings, and/or the like as described). In an example, the UEs 206A-206I can establish connection with the eNBs 204A-204G and/or 208A-208C over the air and/or over a backhaul connection.

As described, macrocell eNBs 204A-204G, and/or UEs communicating therewith, can exhibit interference with respect to small scale eNBs 208A-208C. For example, small scale eNB 208B communicates with UE 206I within cell 202B, which is provided by eNB 204B. Thus, if receiving or transmitting over resources utilized by eNB 204B, small scale eNB 208B can experience interference. In addition, UE 206E can interfere with small scale eNB 208B. Thus, upon initializing communication with the UE 206I, for example, the small scale eNB 208B can generate a downlink control blanking message related to requesting blanking over control resources and can transmit the downlink control blanking message to the UE 206I. In one example, small scale eNB 208B can transmit the message over low reuse resources, using diversity, and/or the like to mitigate interference from the macrocell eNB 204B and/or UE 206E. In response, the UE 206I sends an uplink control blanking request to the macrocell eNB 204B and/or UE 206E, which can accordingly blank over the control resources. In one example, the UE 206I and/or small scale eNB 208B can determine whether the macrocell eNB 204B and/or UE 206E are blanking over the resource based on a pilot transmission.

Small scale eNB 208B can subsequently communicate with the UE 206I over the control resources. In one example, small scale eNB 208B can generate a resource blanking message for requesting blanking general data resources by the eNB 204B and/or UE 206E. Similarly, small scale eNB 208B can transmit the request to UE 206I, over the control resources, for requesting blanking from the eNB 204B and/or UE 206E by the UE 206I. Small scale eNB 208B can communicate with the UE 206I over the control and/or data resources without interference from the macrocell eNB 204B and/or UE 206E.

Figure 3:
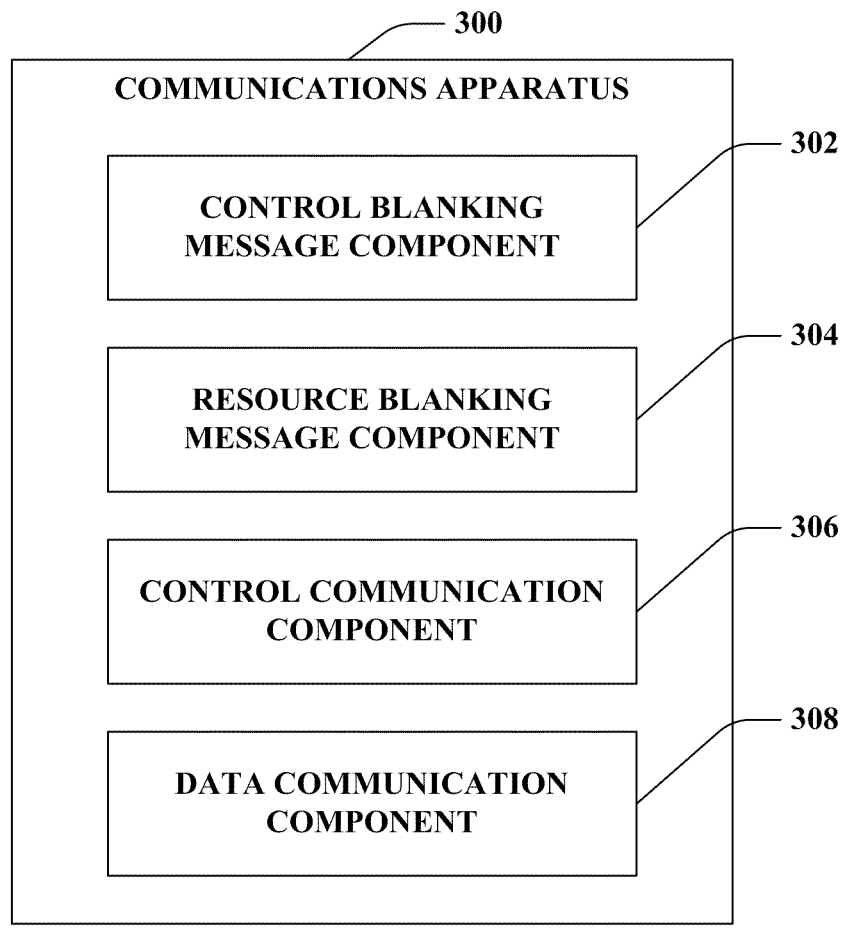
FIG. 3 is an illustration of an example communications apparatus for employment within a wireless communications environment.

Turning to FIG. 3, illustrated is a communications apparatus 300 for employment within a wireless communications environment. The communications apparatus 300 can be an eNB or a portion thereof, or substantially any communications apparatus that communicates over and/or provides access to a wireless network. The communications apparatus 300 includes a control blanking message component 302 that can create a downlink control blanking message to request control resource blanking to facilitate non-interfered control data communication with one or more devices (not shown), a resource blanking message component 304 that can generate a message to request general data resource blanking, a control communication component 306 that transmits and/or receives control data over a set of control resources, and a data communication component 308 that receives data from, and transmits data to, one or more devices over control and/or general data resources.

According to an example, the communications apparatus 300 can provide wireless network access to one or more devices in a wireless network and can communicate within range of a macrocell eNB (not shown). The macrocell eNB, and/or one or more devices communicating therewith, can cause interference to the communications apparatus 300. Thus, for example, the communications apparatus 300 can request blanking of various resources to facilitate non-interfered communication with one or more devices to which it provides wireless network access. The control blanking message component 302, in this regard, can create a downlink control blanking message for transmission to one or more devices upon initially communicating with the one or more devices.

The downlink control blanking message can include specification of control resources for which to request blanking and/or a list of one or more interfering devices or eNBs from which to request the blanking. In one example, the control blanking message component 302 can select the control resources to blank. The control resources can be fixed, in one example. In another example, however, the control blanking message component 302 can generate a downlink control blanking message that indicates parameters defining a diversity scheme for the control resources, such as a hopping scheme, for which blanking is requested. This can mitigate collision with other in-range communications apparatuses similarly requesting blanking of control resources from the one or more interfering devices or eNBs. In one example, the hopping can be based at least in part on a hash of a pilot identifier and system time or another key that defines a channelization for the set of control resources related to the communications apparatus. In another example, the control blanking message component 302 can include the pilot identifier and system time in the downlink control blanking message such that a receiving device can determine the control resources of the hopping scheme for which blanking is requested and accordingly blank or request blanking over the resources in the scheme.

In addition, the control blanking message component 302 can transmit the downlink control blanking message over low reuse dedicated control resources, using a diversity scheme such as hopping, beacon signaling, random reuse, and/or the like, or otherwise so it can be received by the one or more devices to which the communications apparatus 300 provides network access. As described, a device receiving the control blanking message can request blanking over the indicated resource from one or more interfering devices and/or eNBs. The control blanking message component 302 can, in one example, determine whether blanking is effectuated based at least in part on a pilot signal transmitted by the interfering devices and/or eNBs. If the control resources are blanked by interfering devices and/or eNBs, the resource blanking message component 304 and/or control communication component 306 can communicate control data with the one or more devices. In one example, the resource blanking message component 304 can generate a resource blanking message to request general data resource blanking from interfering devices or eNBs and can transmit the message to the one or more devices over the blanked control resources. The data communication component 308 can communicate with the one or more devices over the blanked general data resources. It is to be appreciated that the downlink control blanking message or resource blanking can be part of a disparate message, such as a system acquisition or access message, and/or the like, for example.

Figure 4:
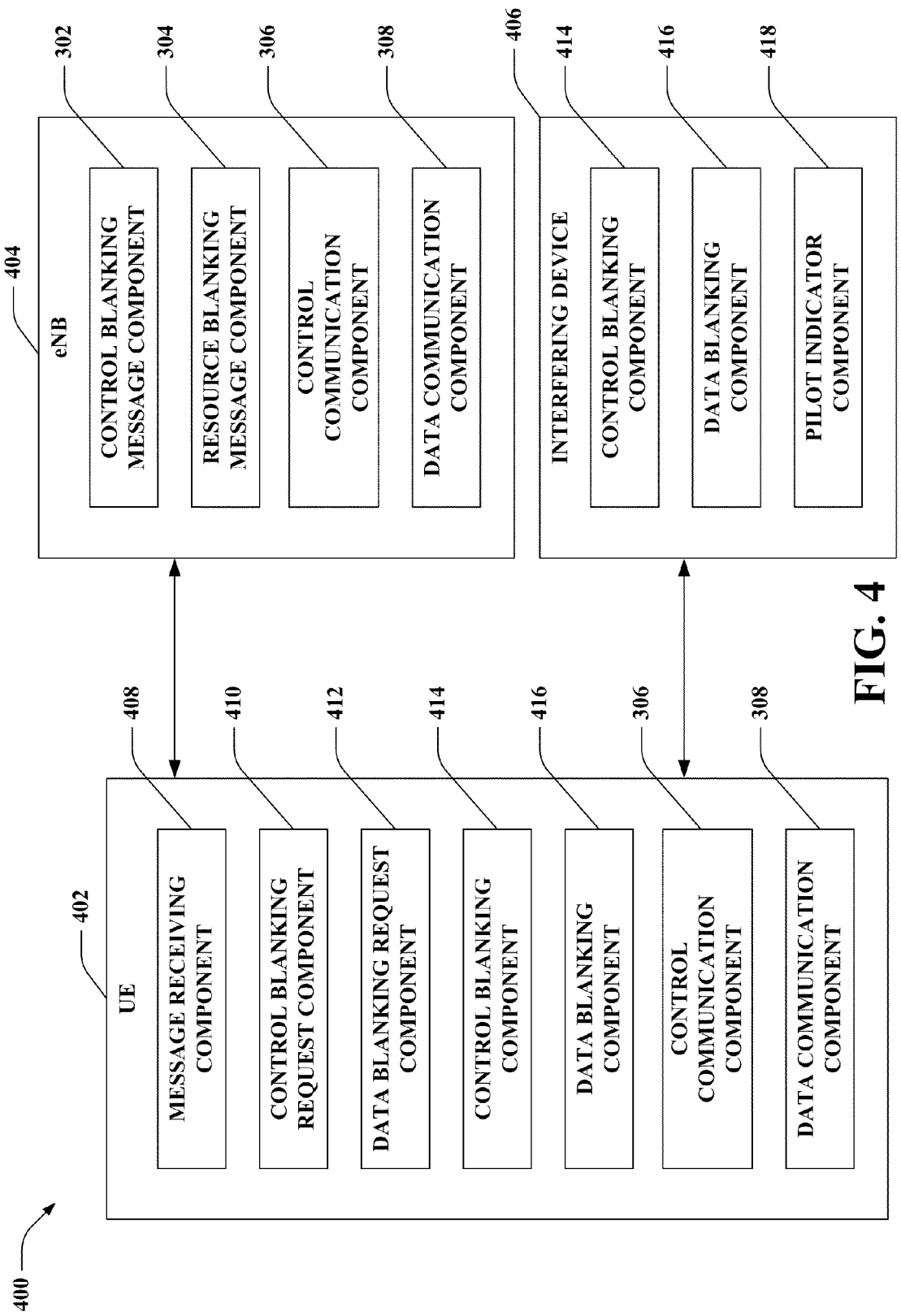
FIG. 4 is an illustration of an example wireless communications system that effectuates requesting blanking of control resources.

Now referring to FIG. 4, illustrated is a wireless communications system 400 that facilitates dynamically allocating control channels to facilitate non-interfered control communications related to eNBs and associated UEs. UE 402 can be a mobile device (including not only independently powered devices, but also modems, for example), a base station, and/or portion thereof, or substantially any wireless device. eNB 404 can be a macrocell base station, femtocell eNB, picocell eNB, relay node, and/or the like. Interfering device 406 can be a UE, eNB, and/or substantially any device communicating in a wireless network. Moreover, system 400 can be a MIMO system and/or can conform to one or more wireless network system specifications (e.g., EV-DO, 3GPP, 3GPP2, 3GPP LTE, WiMAX, etc.) and can comprise additional components to facilitate communication between the UE 402, eNBs, and interfering device 406.

UE 402 comprises a message receiving component 408 that can obtain a downlink control blanking and/or data resource blanking message from an eNB, a control blanking request component 410 that can send control blanking requests related to blanking control data resources to one or more interfering devices, a data blanking request component 412 that can transmit a data blanking request related to blanking over general data resources to one or more interfering devices, a control blanking component 414 that can locally blank over one or more control resources, a data blanking component 416 that can locally blank over one or more data resources, a control communication component 306 that transmits and receives control information over a set of control resources, and a data communication component 308 that can communicate data over a set of data resources.

eNB 404 can comprise a control blanking message component 302 that can, as described, create a downlink control blanking message to request blanking over one or more control channels to facilitate dynamic control channel allocation, a resource blanking message component 304 that generates a resource blanking message for requesting blanking over a collection of general data channels for communicating with the UE 402, a control communication component 306 that transmits and receives control information over a set of control resources, and a data communication component 308 that can communicate data over a set of data resources.

In addition, the interfering device 406 can comprise a control blanking component 414 that blanks over a set of requested control channels, a data blanking component 416 that blanks over a set of requested data channels, and a pilot indicator component 418 that can transmit a pilot signal indicating subsequent transmission information. As described, blanking, in both the control and resource context, can refer to hard silencing where a transmitter can cease transmission during or over the resources. Blanking can also include, however, soft power reduction in combination with beam steering (e.g., forming a spatial null towards the device being interfered).

According to an example, UE 402 can initiate communication with eNB 404 (e.g., initially or as part of reselection), and the control blanking message component 302 can create a control blanking message related to requesting blanking over downlink or uplink control channels for communicating with the UE 402 to facilitate dynamic control channel allocation. As described, the message can include a fixed indication of resources to be blanked, a hopping scheme for blanking, details related to a hopping scheme or other diversity scheme, such as a pilot identifier and system time hash or other key for hopping, and/or the like that corresponds to the interfering device 406. The control blanking message component 302 additionally selects or determines a set of downlink control resources for blanking and generate the control blanking message specifying the set of control resources. In addition, the control blanking message component 302 can transmit the control blanking message over a low reuse dedicated control channel, using a diversity scheme as described above, and/or the like.

Message receiving component 408 can obtain the control blanking message related to the downlink control resources, and control blanking request component 410 can transmit an uplink control blanking request to the interfering device 406 to request blanking over a set of control channels, where the control channels referred to in the control blanking message are downlink control channels. In one example, the interfering device 406 can be identified explicitly in the control blanking message, detected by the UE 402 as an interfering eNB, and/or the like. Alternatively, the control blanking request component 410 can broadcast/multicast an control blanking request for the control channels to facilitate blanking over a set of uplink control channels by in-range eNBs and devices. Similarly, the request can comprise fixed resources for which blanking is requested, hopping or other diversity information, as described above, and/or the like. In addition, the control blanking request component 410 can transmit the request to the interfering device 406 using a diversity scheme, orthogonal data or control channel, low reuse dedicated channel, and/or the like.

In any case, the interfering device 406 can receive the request, and the control blanking component 414 can blank over the requested resources or deny the request. In one example, the pilot indicator component 418 can create a pilot indicator signal that specifies subsequent communication formats of the interfering device 406; the UE 402 and/or eNB 404 can determine whether blanking is performed based at least in part on this pilot indicator. If blanking is performed, the control communication components 306 can transmit/receive control data over the set of control resources. For example, the control communication component 306 of the eNB 404 can transmit a control blanking request to the UE 402 or other devices for blanking a set of uplink control resources. In this example, the message receiving component 408 can obtain the request, and the control blanking component 414 can blank over the set of uplink control resources. In another example, resource blanking message component 304 can generate a resource blanking message for requesting blanking of general data resources and transmit the message to the UE 402 over the control resources blanked by the interfering device 406. In one example, this message can be transmitted in a system access or acquisition message.

Message receiving component 408 can receive this message as well, and the data blanking request component 412 can create and transmit (or forward) an uplink resource blanking request to the interfering device 406 to blank over a set of data resources. The data blanking component 416 can blank over the requested resources or deny the request. Similarly, the pilot indicator component 418 can generate a modified pilot indicator and transmit a related signal, which the UE 402 and/or eNB 404 can utilize to determine whether interfering device 406 is blanking the data resources. In another example, the control communication component 306 of eNB 404 can transmit a pilot signal to UE 402, which can receive the signal and report channel quality feedback to the eNB 404. Based at least in part on this feedback, the eNB 404 (or control communication component 306 or data communication component 308) can determine whether the control and/or data resources were, indeed, blanked by the interfering device 406. If so, for instance, the data communication component 308 in the eNB 404 can communicate data to the data communication component 308 of the UE 402, etc. It is to be appreciated that components of the interfering device 406 can be present in other types of wireless devices, such as a UE communicating with a macrocell eNB where the UE interferes with the eNB 404 and/or UE 402, as described. In this regard, the eNB 404 can similarly leverage the UE 402 to request blanking by the interfering UE.

In another example, the control blanking message component 302 can transmit a control blanking request directly to the UE 402, as described. The message receiving component 408 can obtain the message, and the control blanking component 414 can locally blank over the resources specified in the control blanking request (e.g., where the resources relate to uplink resources). Similarly, the resource blanking message component 304 can transmit a data resource blanking request to the UE 402, and the data blanking component 416 can accordingly locally blank over the data resources.

Figure 5:
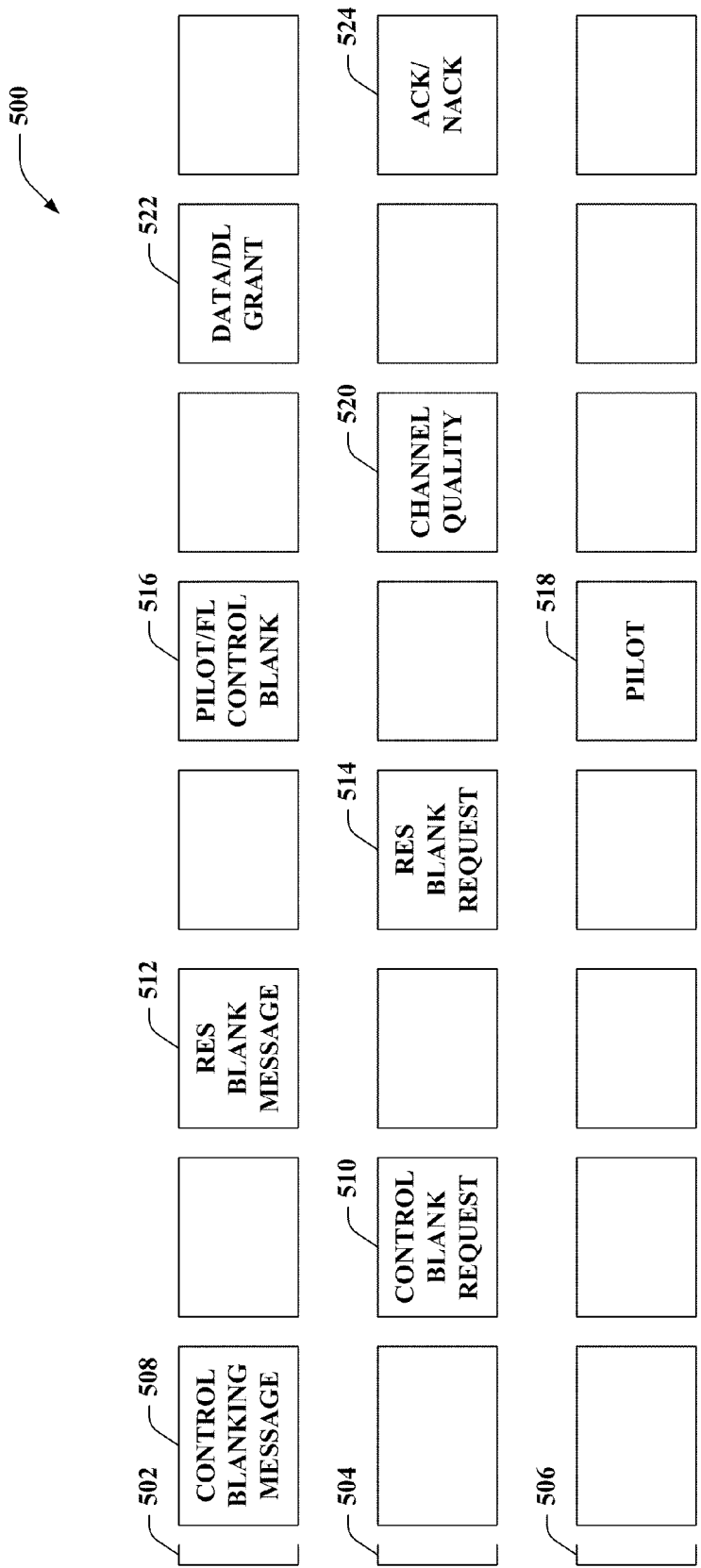
FIG. 5 is an illustration of an example message configuration for requesting blanking from evolved Node Bs (eNB) in a wireless network.

Turning to FIG. 5, an example message configuration 500 is shown that facilitates requesting control blanking to transmit other data blanking requests, as described above. Message configuration 500 represents messages 502 communicated by a serving eNB, which can be a small scale eNB for example, messages 504 communicated by a served UE, and messages 506 communicated by an interfering eNB. It is to be appreciated that columnar aligned messages can represent messages communicated at substantially similar time periods (but can be orthogonal with respect to frequency, for example). Messages in adjacent rows can be transmitted over concurrent periods of time or with fixed or varying periods of time in between. As shown, a serving eNB can communicate a downlink control blanking message 508 to a served UE. The serving eNB can communicate this message, in one example, in response to a system acquisition request.

Served UE can accordingly communicate an uplink control blanking request 510, as described herein, to one or more eNBs interfering on the forward link. The downlink control blanking message 508 and/or uplink control blank request 510 can include, as described, information related to blanking control channels such as a fixed indication of control channels, hopping or other diversity scheme information for determining control channels for which blanking is requested, and/or the like. Interfering eNBs, in one example, can blank over the control channels.

Serving eNB can communicate a downlink resource blanking message 512 to the served UE over blanked control channels. This can be part of another system acquisition or access message, in one example. Served UE can subsequently communicate an uplink resource blank request 514 to facilitate data resource blanking by one or more interfering devices or eNBs, as described. Serving eNB and interfering eNB can transmit pilot signals 516 and 518 that can indicate subsequent transmission resource utilization. For example, the pilot signals 516 and 518 can be precoded to represent subsequent data transmission over the channel such that UE (e.g., the UE communicating messages represented at 504) can perform a channel quality measurement. In addition, serving eNB's pilot message 516 can also include a downlink control blanking request to indicate resources that should be blanked by UEs associated with strong interfering UEs in order to receive uplink control channels from served UEs such as channel quality and acknowledgement/non-acknowledgement (ACK/NACK) messages from the served UE.

The served UE can transmit a channel quality message 520 to the serving eNB indicating quality of an assigned data channel, for example, where the assigned data channel relates to a channel for which blanking was requested in message 514. Thus, for example, serving eNB can determine whether channels were blanked based at least in part on the quality. Serving eNB transmits a data message and/or downlink resource grant 522 to the served UE over the resources for which blanking is requested at 514. The served UE can transmit ACK/NACK data at 524. Thus, control resources interfered over a forward link can be blanked upon request to facilitate providing a dynamically allocated control segment for requesting data channel blanking or communicating other control data between an eNB and a UE.

Figure 6:
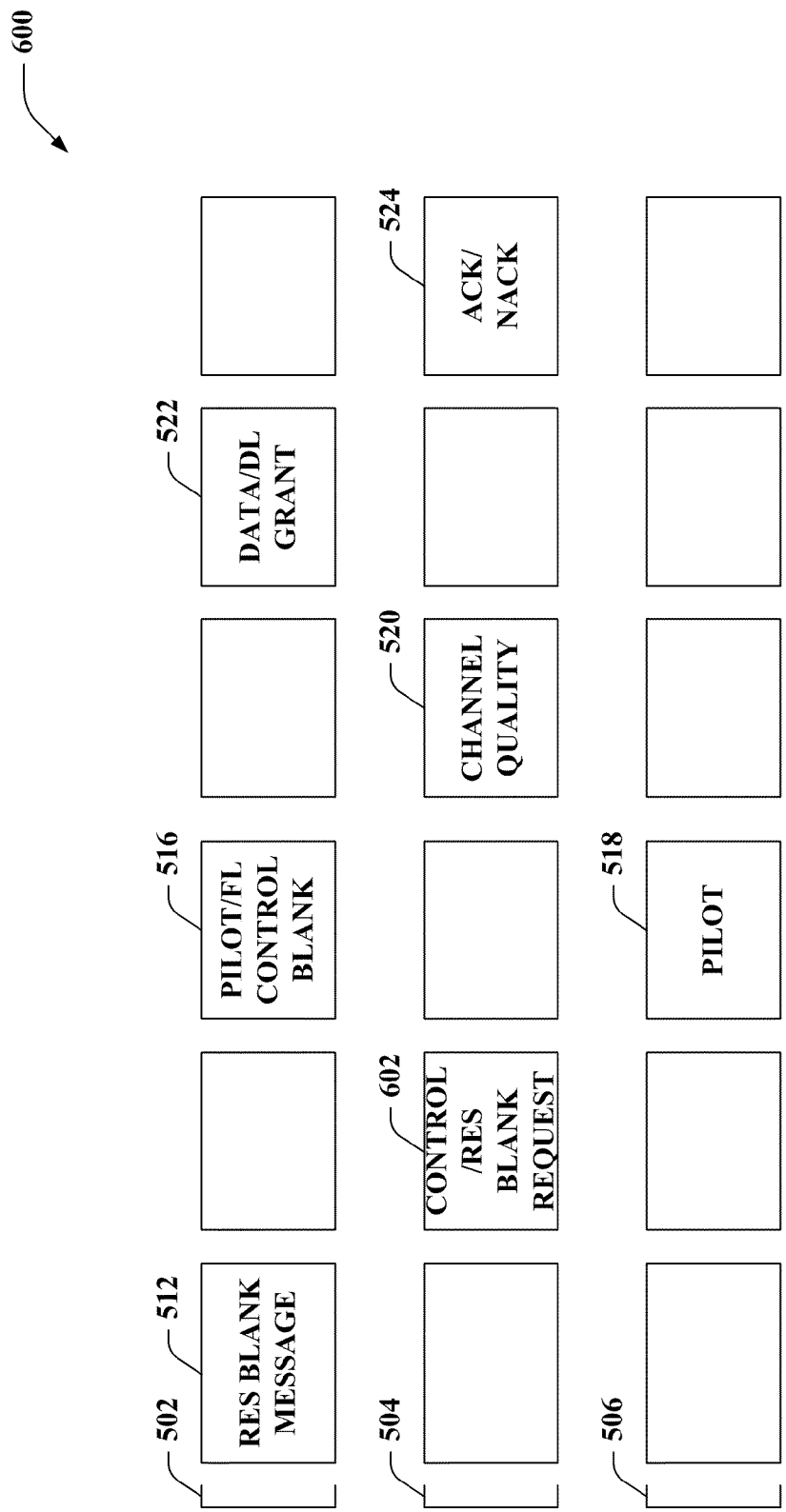
FIG. 6 is an illustration of an example message configuration for requesting control and data blanking in a wireless network.

Referring to FIG. 6, an example message configuration 600 is shown that facilitates requesting downlink control blanking along with downlink resource blanking. Message configuration 600 represents messages 502 communicated by a serving eNB, which can be a small scale eNB for example, messages 504 communicated by a served UE, and messages 506 communicated by an interfering eNB. It is to be appreciated that columnar aligned messages can represent messages communicated at substantially similar time periods (but can be orthogonal with respect to frequency, for example). Messages in adjacent rows can be transmitted over concurrent periods of time or with fixed or varying periods of time in between.

Serving eNB can communicate a downlink resource blanking message 512 to the served UE. The resource blanking message 512 can comprise not only parameters for data resources over which blanking is requested, but also parameters related to control resources over which to additionally request blanking. This can be part of another system acquisition or access message, in one example, as described. Served UE can subsequently communicate an uplink control blanking request and an uplink resource blanking request 602 to facilitate control and data resource blanking by one or more interfering devices or eNBs, as described. Serving eNB and interfering eNB can transmit pilot signals 516 and 518 that can indicate subsequent transmission resource utilization. For example, the pilot signals 516 and 518 can be precoded to represent subsequent data transmission over the channel such that UE (e.g., the UE communicating messages represented at 504) can perform a channel quality measurement. In addition, serving eNB's pilot message 516 can also include a downlink control blanking request to indicate resources that should be blanked by UEs associated with strong interfering UEs in order to receive uplink control channels from served UEs such as channel quality and acknowledgement/non-acknowledgement (ACK/NACK) messages from the served UE.

The served UE can transmit a channel quality message 520 to the serving eNB indicating quality of an assigned data channel, for example, where the assigned data channel relates to a channel for which blanking was requested in message 514. Serving eNB transmits a data message and/or downlink grant 522 to the served UE over the resources for which blanking is requested at 514. The served UE can transmit ACK/NACK data at 524. In this example, as compared to FIG. 5, the control and data resource blanking messages are sent together (at 602). This improves overall latency caused by the additional messages described herein. The configuration in FIG. 5, however, reduces static overhead caused by the messages. This is accomplished by transmitting the downlink control blanking message and subsequent uplink control blanking request separately from the similar data resource blanking messages/requests.

Figure 7:
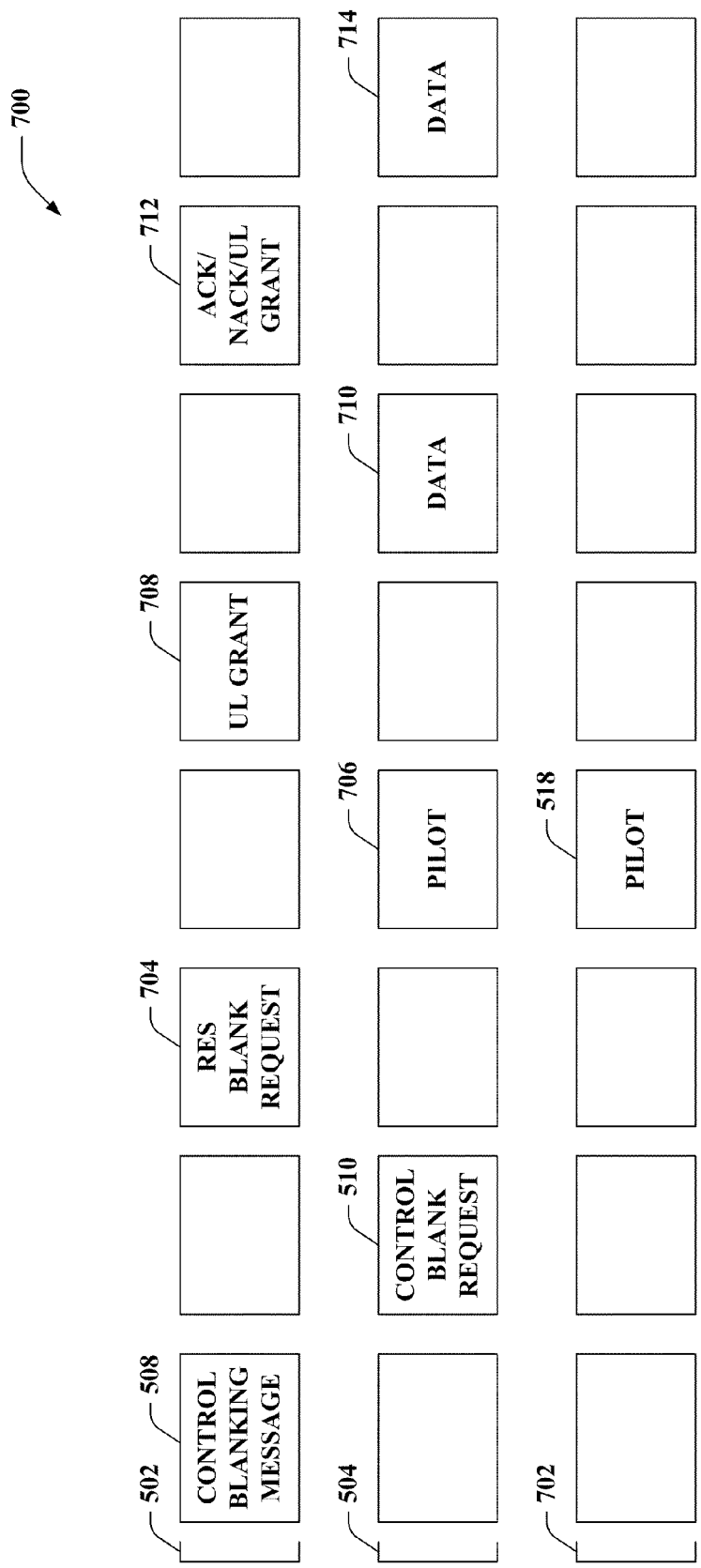
FIG. 7 is an illustration of an example message configuration for requesting blanking from devices in a wireless network.

Turning to FIG. 7, an example message configuration 700 is shown that facilitates requesting downlink control blanking to transmit other data blanking requests and downlink control (including uplink resource grant and acknowledgement of uplink data transmission) without interference, as described above. Message configuration 700 represents messages 502 communicated by a serving eNB, which can be a small scale eNB for example, messages 504 communicated by a served UE, and messages 702 communicated by an interfering UE. It is to be appreciated that columnar aligned messages can represent messages communicated at substantially similar time periods. Messages in adjacent rows can be transmitted over concurrent periods of time or with periods of time in between. As shown, a serving eNB can communicate a control blanking message 508 to a served UE. The serving eNB can communicate this message, in one example, in response to a system acquisition request.

Served UE can accordingly communicate a control blanking request 510, as described herein, to one or more UEs interfering on the reverse link. The control blanking message 508 and/or control blank request 510 can include, as described, information related to blanking control channels such as a fixed indication of control channels, hopping or other diversity scheme information for determining control channels for which blanking is requested, and/or the like.

Serving eNB can communicate a resource blanking request 704 to the interfering UE over blanked control channels. The served UE and the interfering UE can transmit pilot indicators 706 and 518, similarly to those described above for the downlink, to indicate subsequent transmission information. The serving eNB can transmit an uplink grant 708 to the served UE providing a data resources over those resources for which blanking is requested at 510. The served UE can subsequently transmit a data message 710 to the serving eNB, the serving eNB can transmit an ACK/NACK and/or UL grant message at 712 over blanked control channels, and the served UE can continue transmitting data message 714. Thus, control resources interfered by an interfering UE over a reverse link can be blanked upon request to facilitate providing a dynamically allocated control segment for requesting data channel blanking or communicating other control data between an eNB and a UE.

Figure 8:
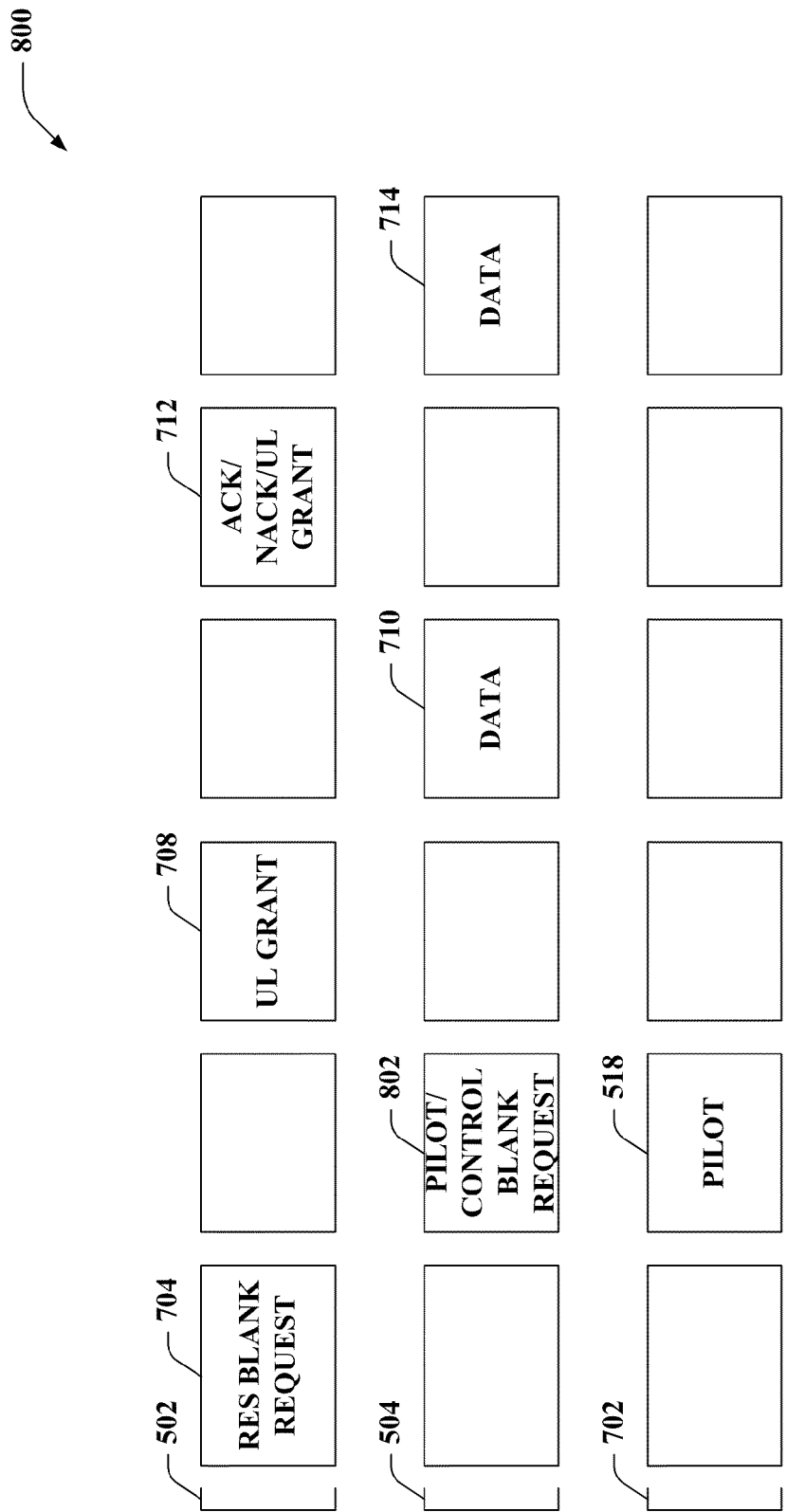
FIG. 8 is an illustration of an example message configuration for requesting control and data blanking from devices in a wireless network.

Turning to FIG. 8, an example message configuration 800 is shown that facilitates requesting downlink control blanking along with data blanking requests, similarly to FIG. 6, but in the context of interfering UEs. Message configuration 800 represents messages 502 communicated by a serving eNB, which can be a small scale eNB for example, messages 504 communicated by a served UE, and messages 702 communicated by an interfering UE. It is to be appreciated that columnar aligned messages can represent messages communicated at substantially similar time periods. Messages in adjacent rows can be transmitted over concurrent periods of time or with periods of time in between.

Serving eNB can communicate a resource blanking request 704 to the interfering UE. The resource blanking message 512 can comprise not only parameters for data resources over which blanking is requested, but also parameters related to control resources over which to additionally request blanking. This can be part of another system acquisition or access message, in one example. The served UE and the interfering UE can transmit pilot indicators 802 and 518, similarly to those described above for the downlink, to indicate subsequent transmission information, but the served UE can additionally transmit an uplink control blanking request with the pilot 802. Accordingly, for example, the interfering UE can blank over the requested control channels. The serving eNB can transmit a UL grant 708 to the served UE providing a data resources over those resources for which blanking is requested at 510. The served UE can subsequently transmit a data message 710 to the serving eNB, the serving eNB can transmit an ACK/NACK and/or UL grant message at 712 over blanked control channels, and the served UE can continue transmitting data message 714. As described, this improves overall latency caused by the additional messages, as compared to the configuration in FIG. 7, with the side effect that it increases static overhead.

Referring to FIGS. 9-12, methodologies relating to providing a dynamically allocated control segment are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 9:
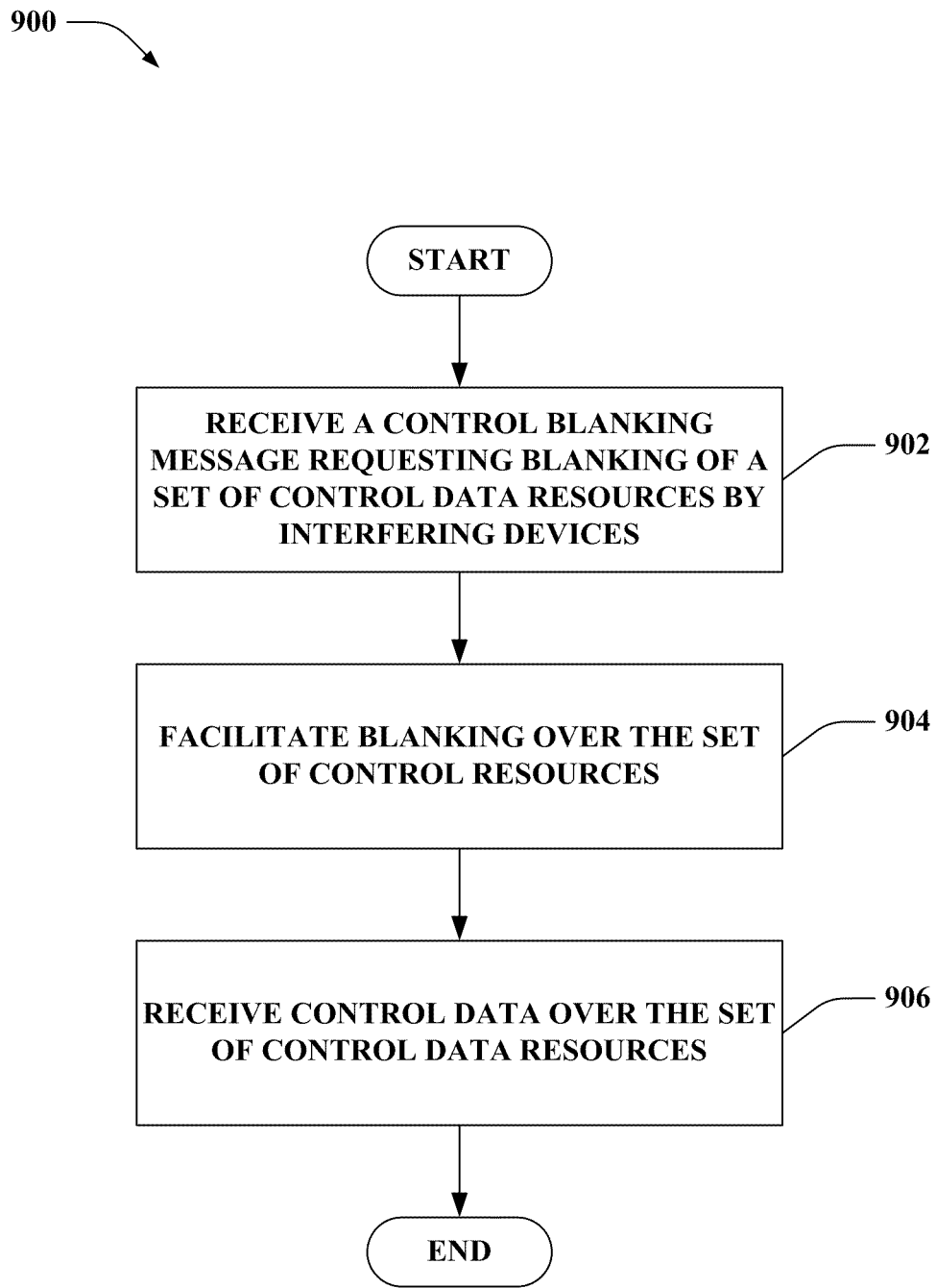
FIG. 9 is an illustration of an example methodology that facilitates blanking over a set of control resources based on a received control blanking message.

Turning to FIG. 9, an example methodology 900 that facilitates requesting control resource blanking based on a control blanking message from an eNB is illustrated. At 902, a control blanking message can be received that requests blanking of a set of control data resources by interfering devices. The interfering devices, as described, can relate to one or more eNBs, such as macrocell eNBs, and/or UEs communicating therewith. In addition, the control blanking message can be received from a small scale eNB providing wireless network access. Moreover, as described, the set of control data resources can be explicitly defined, defined by a hopping pattern or one or more parameters related thereto (such as a key), and/or the like. At 904, blanking is facilitated over the set of control resources. For example, where the resources are downlink resources, a control resource blanking request can be generated for the set of control data resources and transmitted to interfering eNBs or devices. Where the resources are uplink control resources, for example, local blanking can be performed over the control resources. At 906, control data can be received over the set of control data resources. In an example, the control data can be received from the small scale eNB, as described, and can be a resource blanking message related to a set of general data resources.

Figure 10:
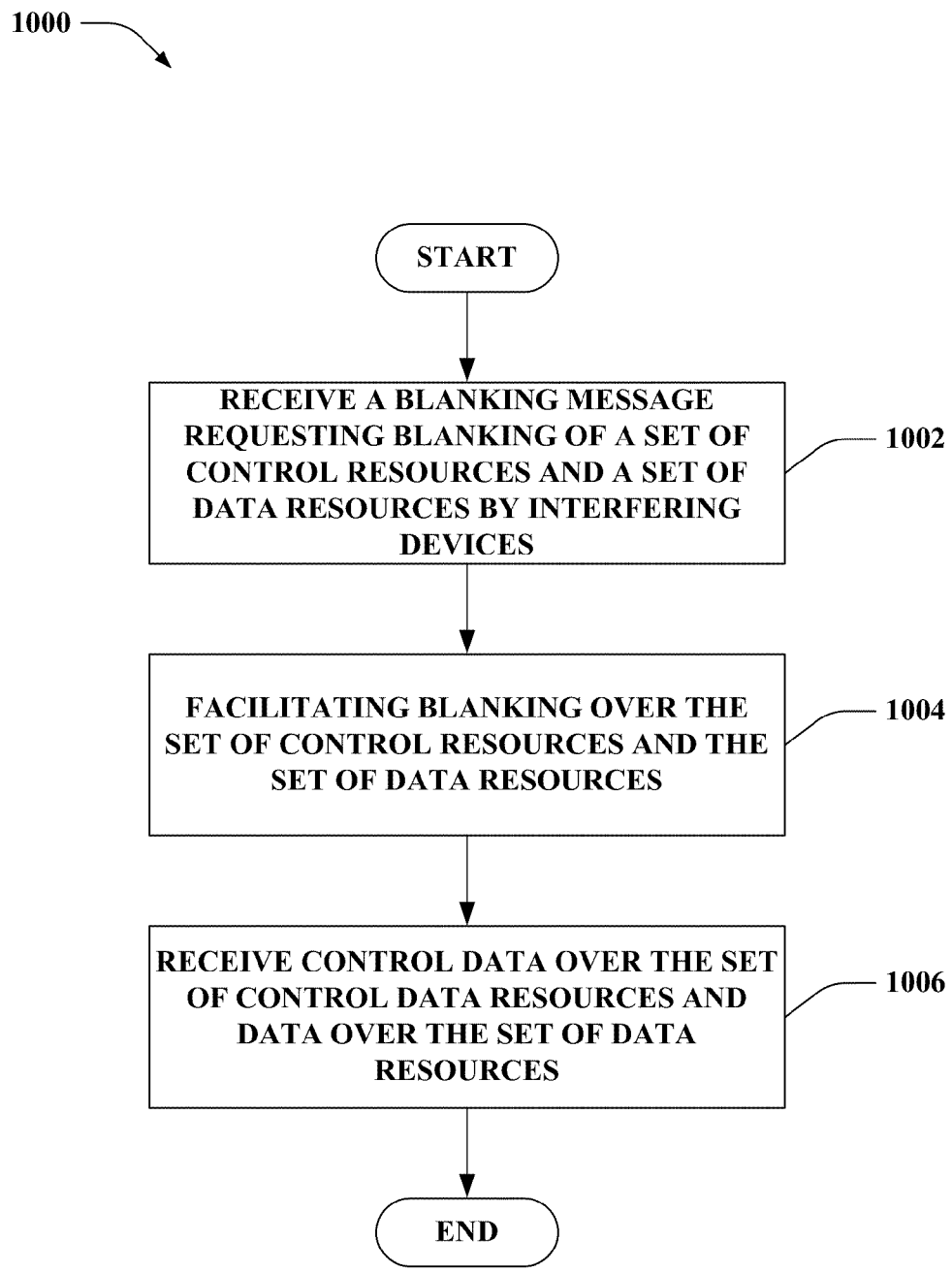
FIG. 10 is an illustration of an example methodology that facilitates blanking over a set of control and data resources based on a received blanking message.

Referring to FIG. 10, an example methodology 1000 that facilitates requesting control and data resource blanking based on an uplink control and data blanking message from an eNB is illustrated. At 1002, a blanking message can be received that requests blanking of a set of control resources and a set of data resources by interfering devices. The interfering devices, as described, can relate to one or more eNBs, such as macrocell eNBs, and/or UEs communicating therewith. In addition, the control and data blanking message can be received from a small scale eNB providing wireless network access. Moreover, as described, the set of control data resources can be explicitly defined, defined by a hopping pattern or one or more parameters related thereto (such as a key), and/or the like. At 1004, blanking over the set of control resources and the set of data resources is facilitated. For example, where the set of control resources and/or data resources are downlink resources, a downlink control and data resource blanking request can be generated for the set of control data resources. Where uplink resources, local blanking can be performed, as described above. At 1006, control data can be received over the set of control data resources and data can be received over the set of data resources.

Figure 11:
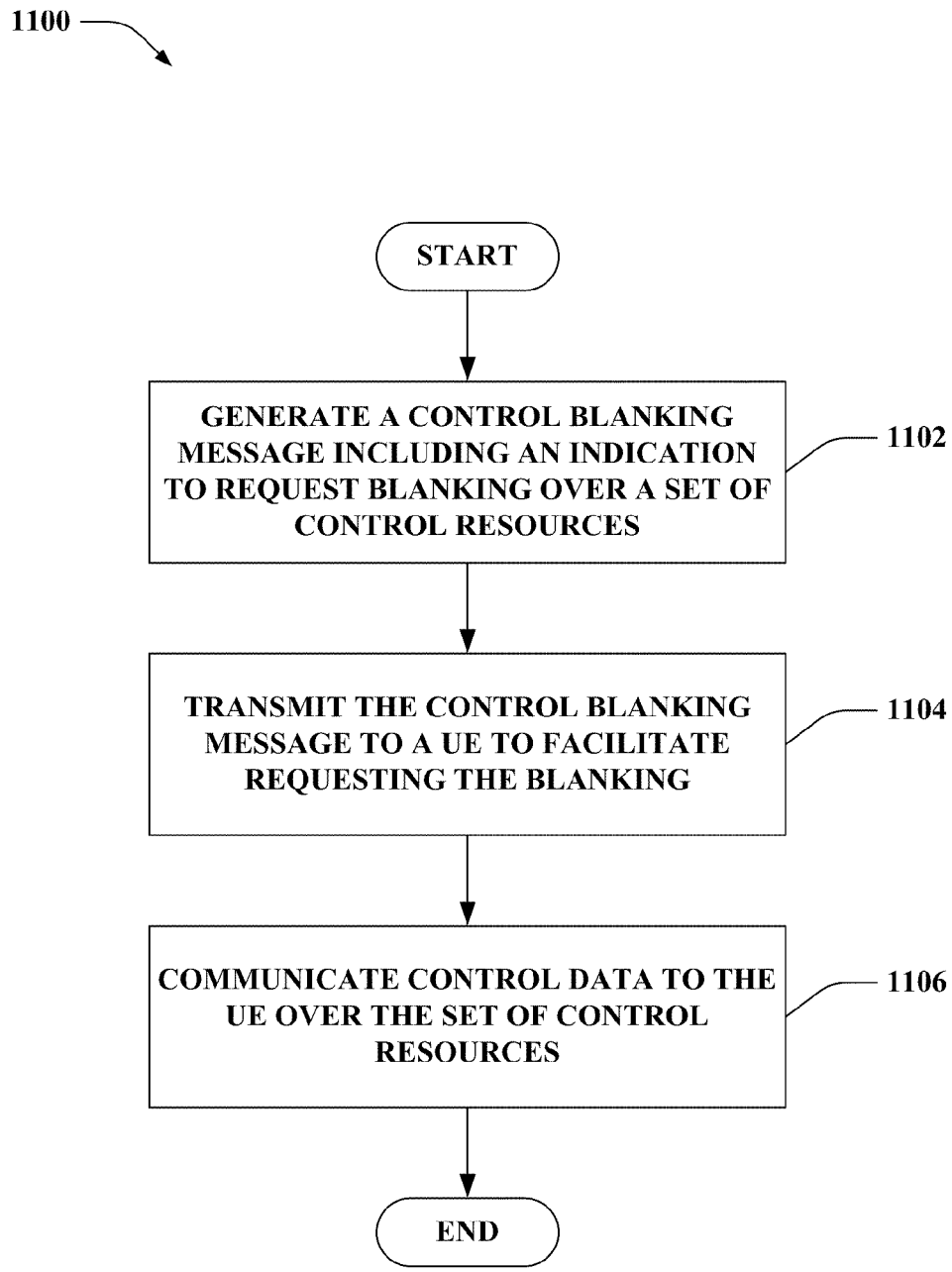
FIG. 11 is an illustration of an example methodology that facilitates transmitting a control blanking message to blank control resources.

Referring to FIG. 11, an example methodology 1100 is shown that facilitates requesting blanking of a set of control resources by utilizing a UE to transmit the request. At 1102, a control blanking message can be generated that includes an indication to request blanking over a set of control resources. As described, the control blanking message can also include an indication of interfering devices to which the request for blanking should be transmitted. In addition, as mentioned, the control blanking message can comprise an explicit indication of the set of control resources, parameters for determining the resources such as hopping metrics, etc., and/or the like. At 1104, the control blanking message can be transmitted to a UE to facilitate requesting the blanking, and at 1106, control data can be communicated to the UE over the set of control resources. The control data, in one example, can relate to similarly requesting blanking of general data resources (e.g., using a resource blanking message). In addition, though not shown, a pilot indicator of the interfering devices can be verified to determine whether the interfering devices are blanking the set of control data (and/or general data) resources in subsequent communications.

Figure 12:
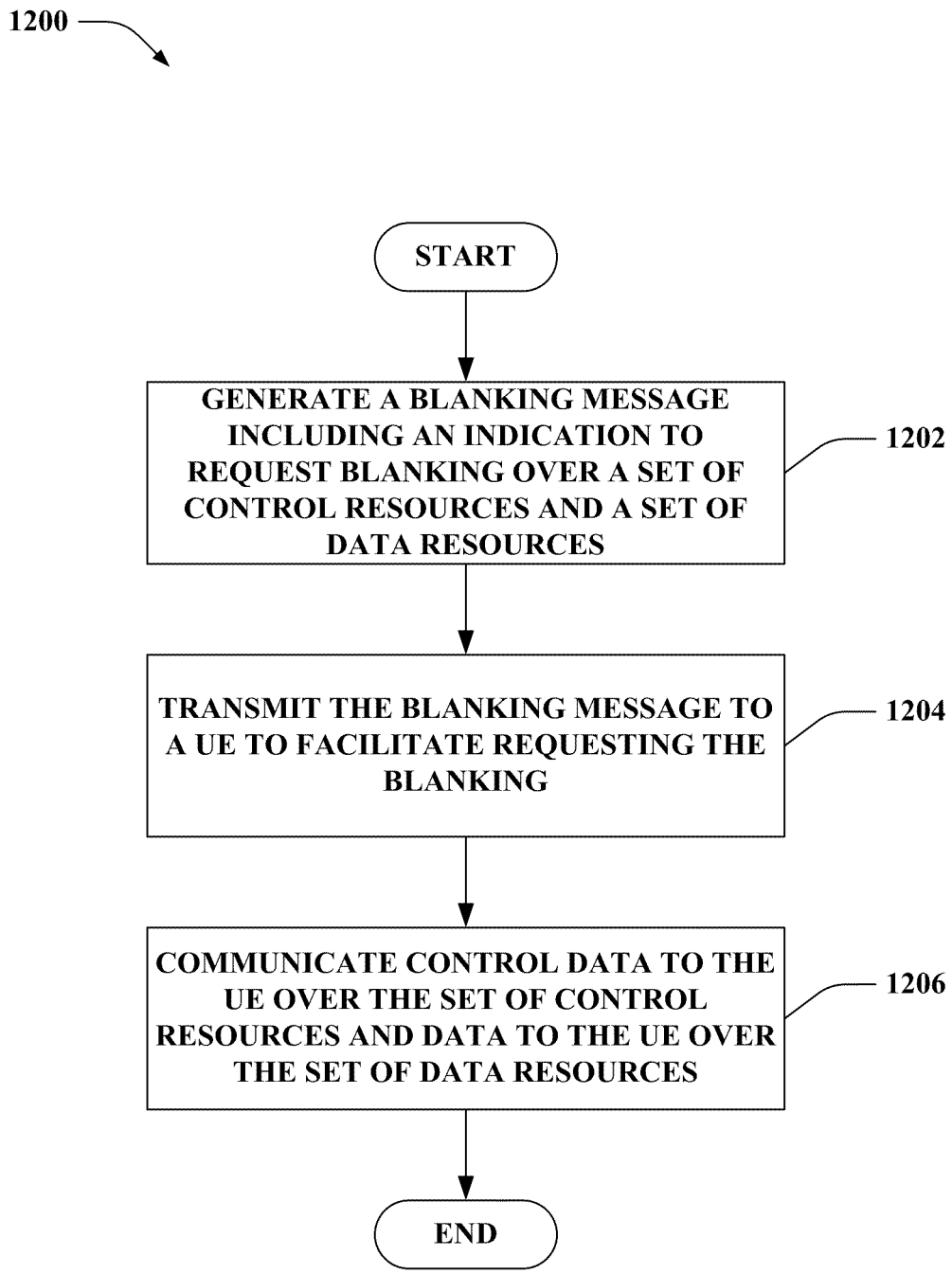
FIG. 12 is an illustration of an example methodology that facilitates transmitting a control and data blanking message to blank control and data resources.

Turning to FIG. 12, an example methodology 1200 that facilitates requesting blanking of a set of control and data resources by leveraging a UE to transmit the request to interfering devices is shown. At 1202, a blanking message can be generated that includes an indication to request blanking over a set of control resources and a set of data resources. As described, the blanking message can also include an indication of interfering devices to which the request for blanking should be transmitted. In addition, as mentioned, the blanking message can comprise an explicit indication of the set of control resources and data resources, parameters for determining the resources such as hopping metrics, etc., and/or the like. At 1204, the blanking message can be transmitted to a UE to facilitate requesting the blanking, and at 1206, control data can be communicated to the UE over the set of control resources and data can be communicated to the UE over the set of data resources. In addition, though not shown, a pilot indicator of the interfering devices can be verified to determine whether the interfering devices are blanking the set of control and/or data resources in subsequent communications.

It will be appreciated that, in accordance with one or more aspects described herein, inferences can be made regarding determining whether control data resources for which blanking is requested are blanked by interfering devices, discerning which control data resources are to be blanked, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 13:
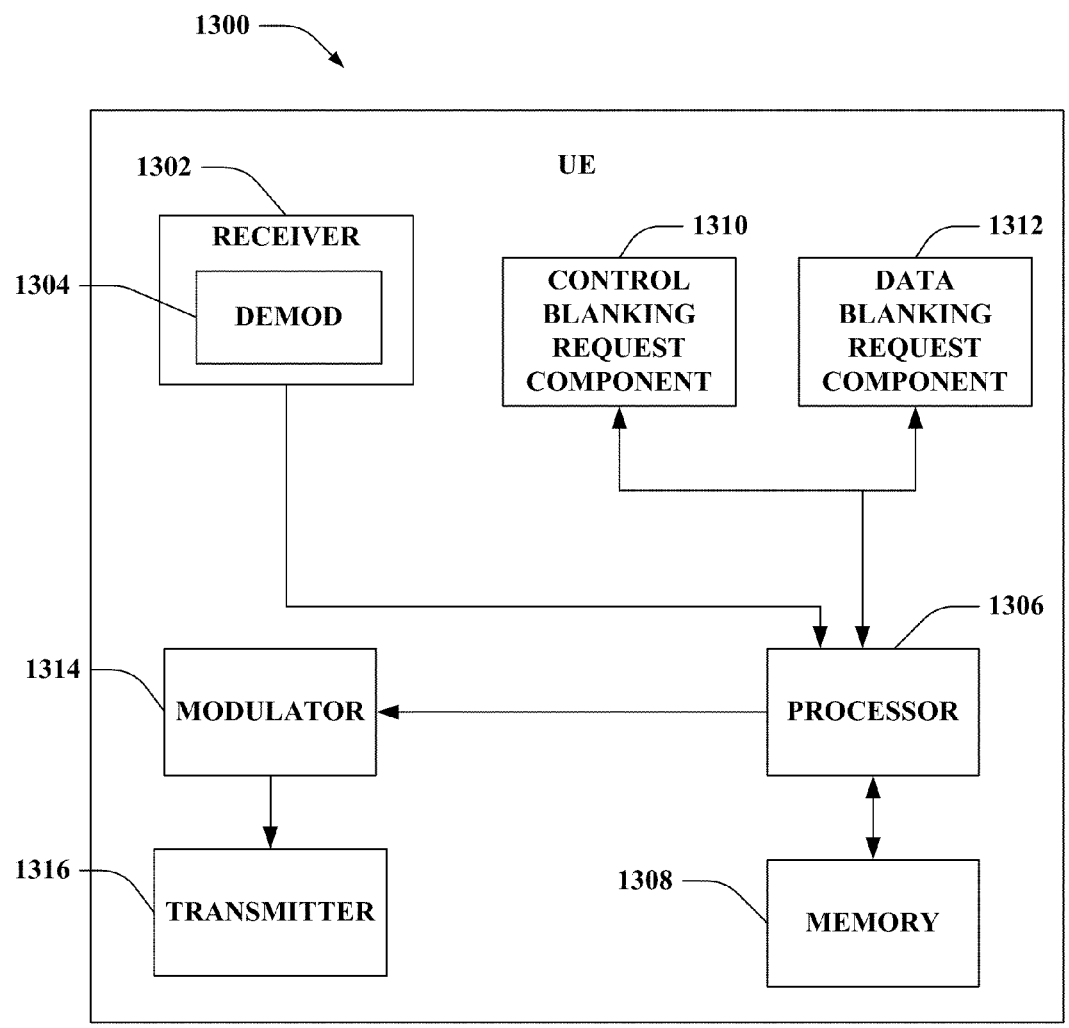
FIG. 13 is an illustration of an example user equipment (UE) that facilitates requesting resource blanking on behalf of an eNB.

FIG. 13 is an illustration of a UE 1300 that facilitates requesting control and general data resource blanking based at least in part on received messages. UE 1300 comprises a receiver 1302 that receives one or more signals over one or more carriers from, for instance, a receive antenna (not shown), performs typical actions on (e.g., filters, amplifies, downconverts, etc.) the received signals, and digitizes the conditioned signals to obtain samples. Receiver 1302 can comprise a demodulator 1304 that can demodulate received symbols and provide them to a processor 1306 for channel estimation. Processor 1306 can be a processor dedicated to analyzing information received by receiver 1302 and/or generating information for transmission by a transmitter 1316, a processor that controls one or more components of UE 1300, and/or a processor that both analyzes information received by receiver 1302, generates information for transmission by transmitter 1316, and controls one or more components of UE 1300.

UE 1300 can additionally comprise memory 1308 that is operatively coupled to processor 1306 and that can store data to be transmitted, received data, information related to available channels, data associated with analyzed signal and/or interference strength, information related to an assigned channel, power, rate, or the like, and any other suitable information for estimating a channel and communicating via the channel. Memory 1308 can additionally store protocols and/or algorithms associated with estimating and/or utilizing a channel (e.g., performance based, capacity based, etc.).

It will be appreciated that the data store (e.g., memory 1308) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1308 of the subject systems and methods is intended to comprise, without being limited to, these and any other suitable types of memory.

Processor 1306 can further be operatively coupled to control blanking request component 1310 that can generate a control blanking request for transmission to an eNB and a data blanking request component 1312 that can generate a blanking request message for general data resources for transmission to an eNB. In one example, the receiver 1302 can obtain a control blanking message from a small scale eNB, as described, related to requesting blanking for a set of control data resources. The control blanking message can be received over a low reuse dedicated channel, using diversity schemes such as beacons, reuse, etc., and/or the like. In addition, the control blanking message can comprise an explicit indication of the set of control resources, information for determining the set of control resources (e.g., hopping information and/or the like, as described), etc. The control blanking request component 1310 can formulate a control blanking request based on the set of control data resources and/or related information for determining such, and can transmit the request to an interfering device or eNB.

In addition, the receiver 1302 can obtain a resource blanking message for a set of general data resources over the set of control data resources. The data blanking request component 1312 can similarly formulate a request to blank over the general data resources for one or more interfering devices or eNBs, and can transmit the message to the interfering devices or eNBs. Subsequently, as described, receiver 1302 can receive data from the small scale eNB over the general data resources as well. UE 1300 still further comprises a modulator 1314 and transmitter 1316 that respectively modulate and transmit signals to, for instance, a base station, another UE, etc. Although depicted as being separate from the processor 1306, it is to be appreciated that the demodulator 1304, control blanking request component 1310, data blanking request component 1312, and/or modulator 1314 can be part of the processor 1306 or multiple processors (not shown).

Figure 14:
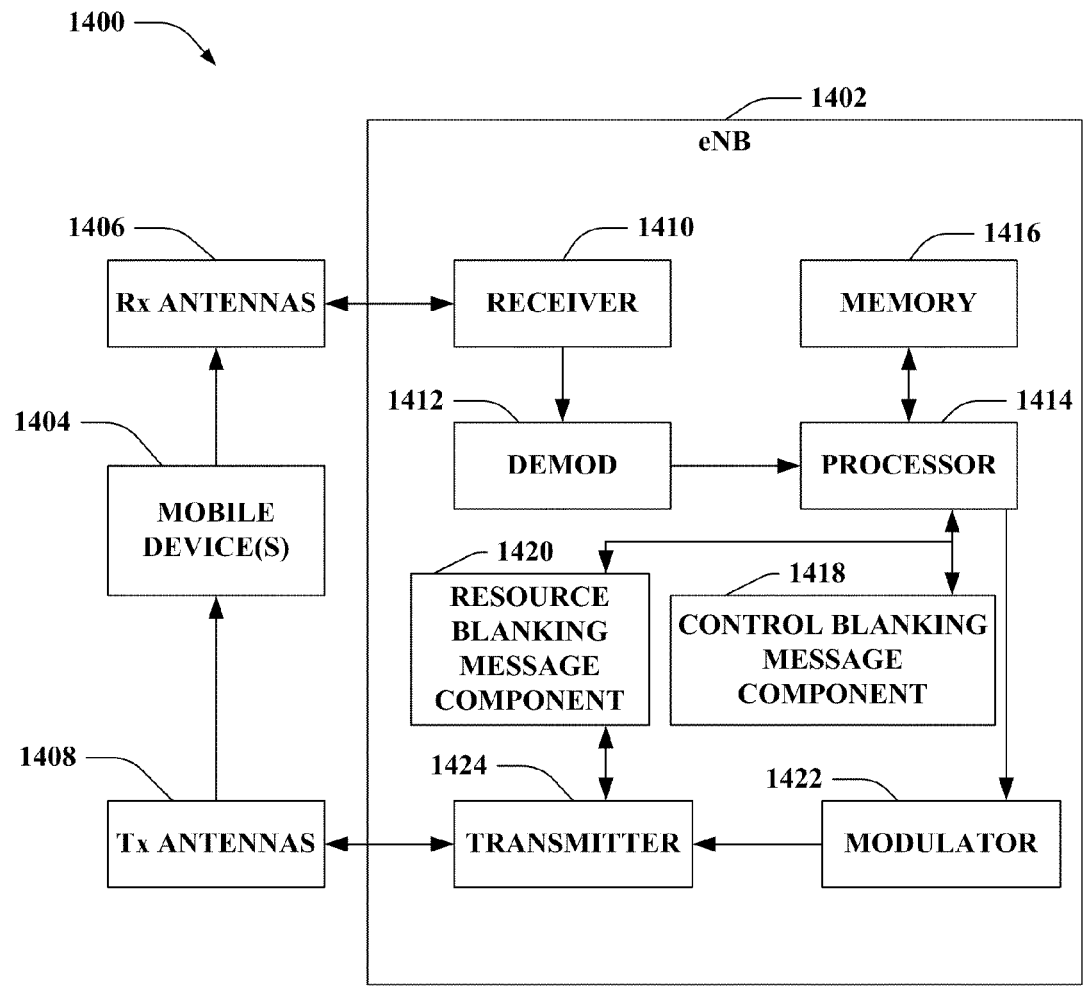
FIG. 14 is an illustration of an example system that requests blanking of resources using a UE.

FIG. 14 is an illustration of a system 1400 that facilitates transmitting control blanking messages and resource blanking messages to UEs. The system 1400 comprises a base station 1402 (e.g., eNB, . . . ) with a receiver 1410 that receives signal(s) from one or more UEs 1404 through a plurality of receive antennas 1406, and a transmitter 1424 that transmits to the one or more UEs 1404 through a transmit antenna 1408. Receiver 1410 can receive information from receive antennas 1406 and is operatively associated with a descrambler that can decode received signals. Furthermore, demodulator 1412 can demodulate received descrambled signals. Demodulated symbols are analyzed by a processor 1414 that can be similar to the processor described above with regard to FIG. 9, and which is coupled to a memory 1416 that stores information related to estimating a signal (e.g., pilot) strength and/or interference strength, data to be transmitted to or received from UE(s) 1404 (or a disparate base station (not shown)), and/or any other suitable information related to performing the various actions and functions set forth herein. Processor 1414 is further coupled to a control blanking message component 1418 that generates a control blanking message for requesting blanking over a set of control resources and a resource blanking message component 1420 that creates resource blanking message to request blanking over general data resources, as described herein.

According to an example, the control blanking message component 1418 can generate a message to request blanking of a set of control resources from one or more interfering devices. The control blanking message component 1418 can utilize the transmitter 1424 to send the message to one or more UE(s) 1404 to facilitate requesting the blanking, as described. The control blanking message, as mentioned, can comprise an explicit indication of control resources, information for determining resources for blanking (e.g., hopping information for providing diversity, such as a key for hopping, and/or the like). In addition, the resource blanking message component 1420 can similarly utilize transmitter 1424 to send a resource blanking message, comprising a request to blank general data resources by one or more interfering devices, to the UE(s) 1404 over the control data resources, as described. Furthermore, although depicted as being separate from the processor 1414, it is to be appreciated that the demodulator 1412, control blanking message component 1418, resource blanking message component 1420, and/or modulator 1422 can be part of the processor 1414 or multiple processors (not shown).

Figure 15:
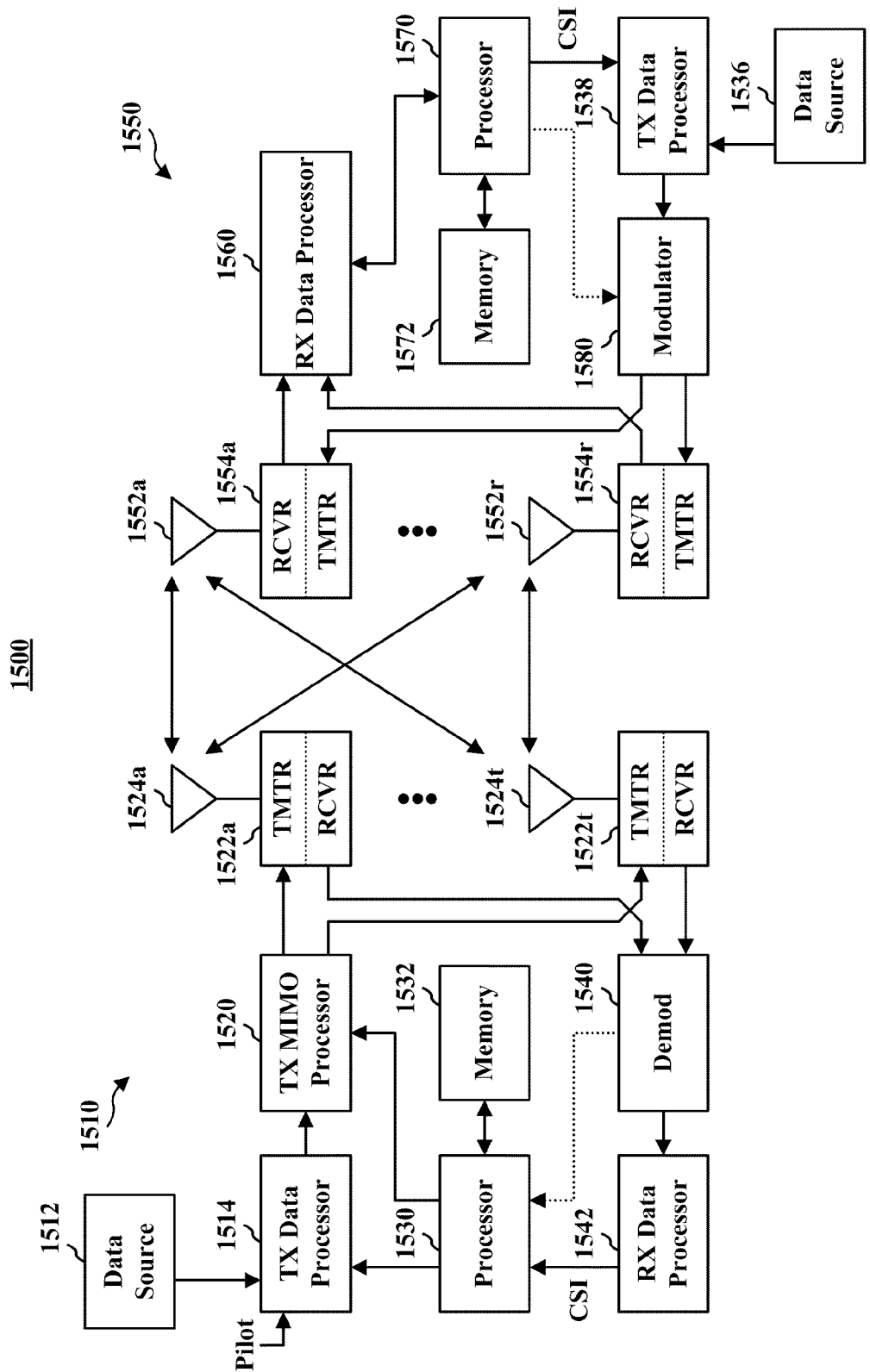
FIG. 15 is an illustration of an example wireless network environment that can be employed in conjunction with the various systems and methods described herein.

FIG. 15 shows an example wireless communication system 1500. The wireless communication system 1500 depicts one base station 1510 and one UE 1550 for sake of brevity. However, it is to be appreciated that system 1500 can include more than one base station and/or more than one UE, wherein additional base stations and/or UEs can be substantially similar or different from example base station 1510 and UE 1550 described below. In addition, it is to be appreciated that base station 1510 and/or UE 1550 can employ the systems (FIGS. 1-4 and 13-14), configurations (FIGS. 5-8), and/or methods (FIGS. 9-12) described herein to facilitate wireless communication there between.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at UE 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides $N_T$ modulation symbol streams to $N_T$ transmitters (TMTR) 1522a through 1522t. In various aspects, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1522a through 1522t are transmitted from $N_T$ antennas 1524a through 1524t, respectively.

At UE 1550, the transmitted modulated signals are received by $N_R$ antennas 1552a through 1552r and the received signal from each antenna 1552 is provided to a respective receiver (RCVR) 1554a through 1554r. Each receiver 1554 conditions (e.g., filters, amplifies, and downconverts) a respective signal, digitizes the conditioned signal to provide samples, and further processes the samples to provide a corresponding "received" symbol stream.

An RX data processor 1560 can receive and process the $N_R$ received symbol streams from $N_R$ receivers 1554 based on a particular receiver processing technique to provide $N_T$ "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

A processor 1570 can periodically determine which precoding matrix to utilize as discussed above. Further, processor 1570 can formulate a reverse link message comprising a matrix index portion and a rank value portion.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from UE 1550 are received by antennas 1524, conditioned by receivers 1522, demodulated by a demodulator 1540, and processed by a RX data processor 1542 to extract the reverse link message transmitted by UE 1550. Further, processor 1530 can process the extracted message to determine which precoding matrix to use for determining the beamforming weights.

Processors 1530 and 1570 can direct (e.g., control, coordinate, manage, etc.) operation at base station 1510 and UE 1550, respectively. Respective processors 1530 and 1570 can be associated with memory 1532 and 1572 that store program codes and data. Processors 1530 and 1570 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 16:
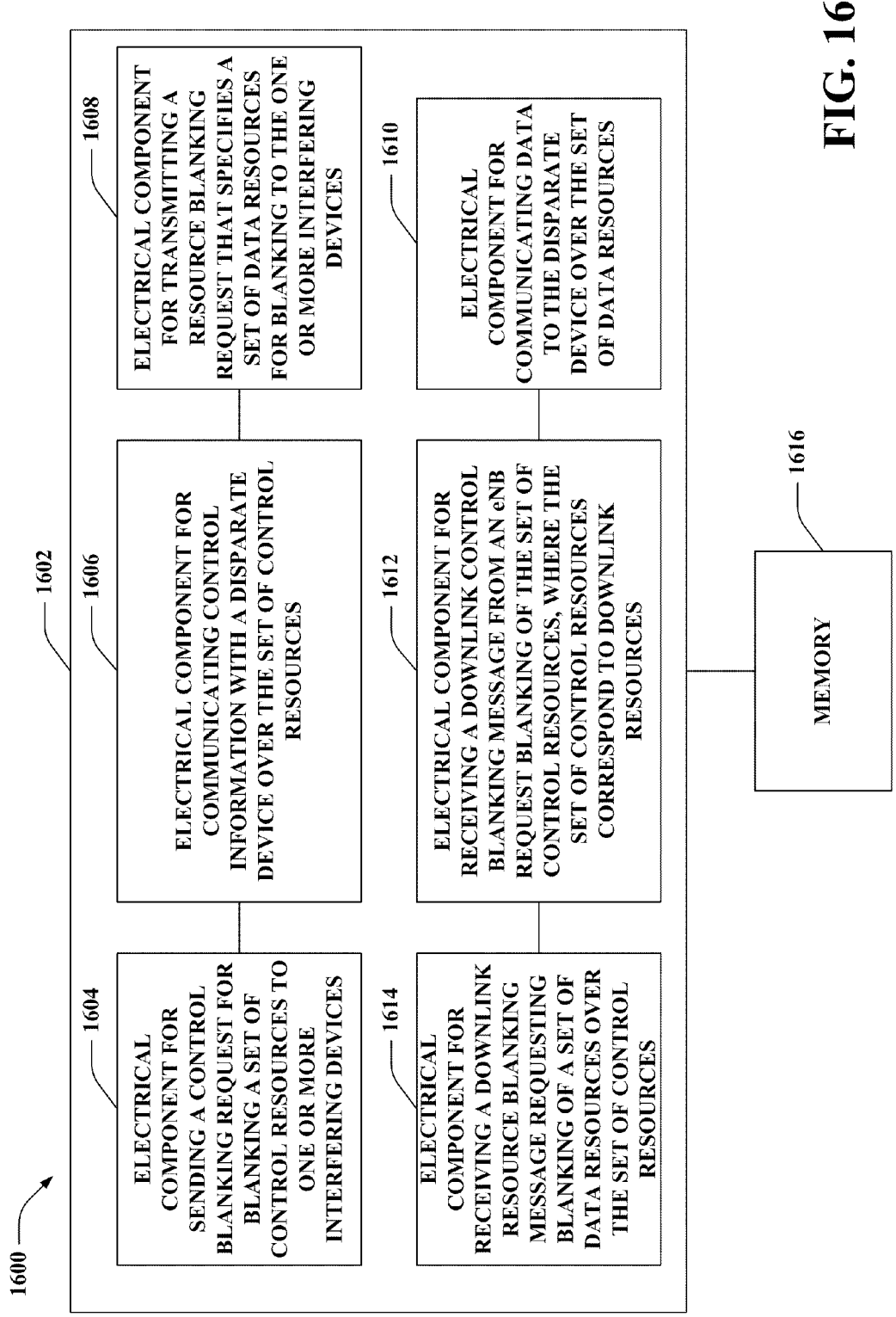
FIG. 16 is an illustration of an example system that requests control and/or data resource blanking.

With reference to FIG. 16, illustrated is a system 1600 that facilitates requesting blanking from interfering devices or eNBs. For example, system 1600 can reside at least partially within a base station, UE, etc. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For instance, logical grouping 1602 can include an electrical component for sending a control blanking request for blanking a set of control resources to one or more interfering devices 1604. For example, as described, the control blanking request can explicitly indicate resources (e.g., by frequency and/or time), indicate parameters for determining the resources (e.g., hopping pattern, reuse, or other diversity information), and/or the like. In addition, the control blanking request can be received over a low reuse dedicated channel and/or using diversity to ensure message receipt. Also, as described, the control blanking request can be part of a control blanking message sent by the electrical component 1604.

In addition, logical grouping 1602 can include an electrical component for communicating control information with a disparate device over the set of control resources 1606. In one example, the control information can be a subsequent control blanking request, as described, for a set of uplink resources. The control information can relate to other control data as well, such as a resource blanking request or message, as described. Thus, logical grouping 1602 can also include an electrical component for transmitting a resource blanking request that specifies a set of data resources for blanking to the one or more interfering devices 1608. Logical grouping 1602 can also comprise an electrical component for communicating data to the disparate device over the set of data resources 1610.

In addition, logical grouping 1602 can include an electrical component for receiving a downlink control blanking message from an eNB requesting blanking of the set of control resources where the set of control resources correspond to downlink resources 1612. In this regard, the control blanking request can be sent upon receiving the control blanking message, as described previously. Moreover, logical grouping 1602 can include an electrical component for receiving a downlink resource blanking message requesting blanking of a set of data resources over the set of control resources 1614. In this regard, the electrical component 1610 can similarly communicate data over this set of data resources. Additionally, system 1600 can include a memory 1616 that retains instructions for executing functions associated with electrical components 1604, 1606, 1608, 1610, 1612 and 1614. While shown as being external to memory 1610, it is to be understood that one or more of electrical components 1604, 1606, 1608, 1610, 1612, and 1614 can exist within memory 1616.

Figure 17:
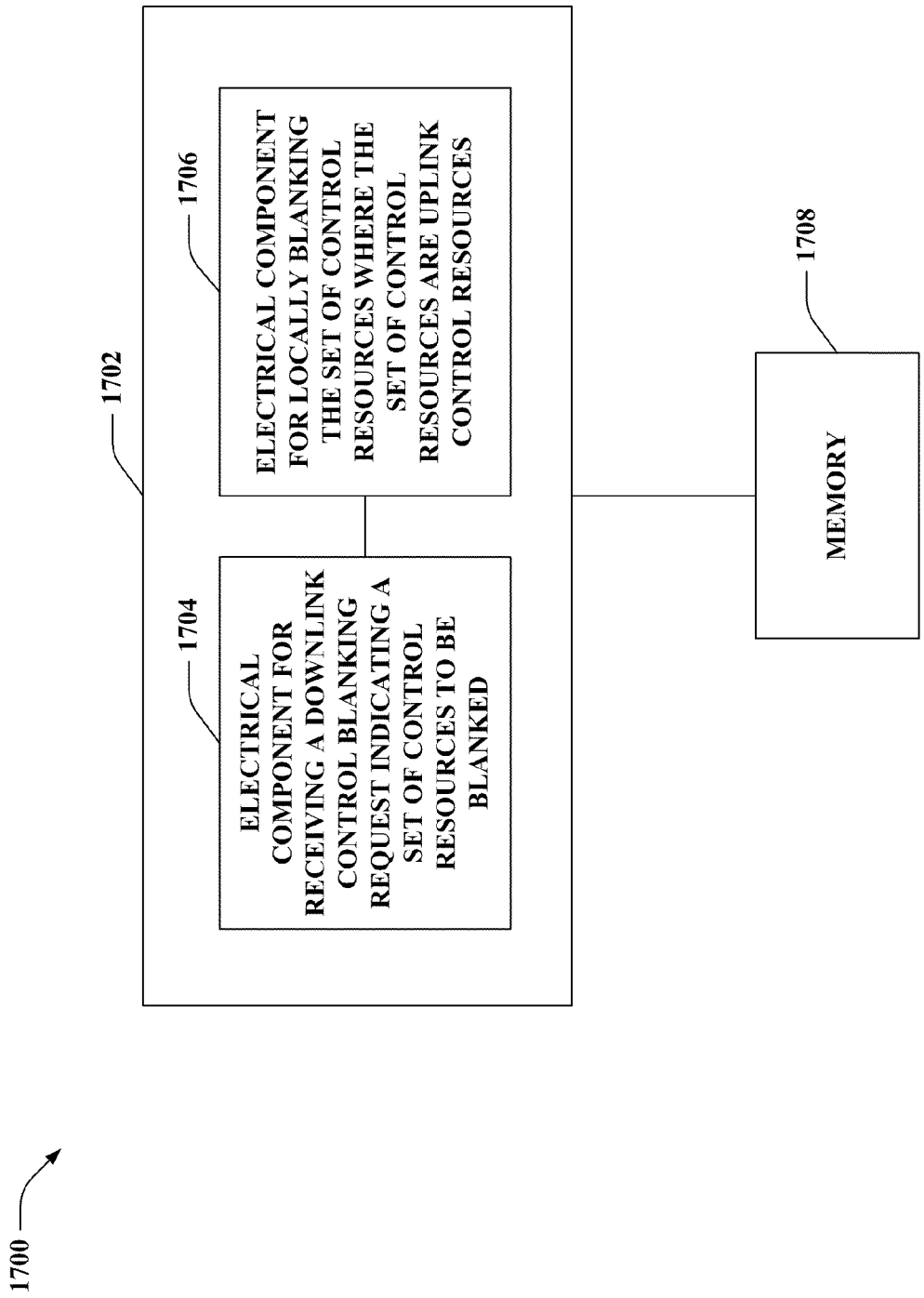
FIG. 17 is an illustration of an example system that transmits a control blanking message to facilitate requesting control resource blanking.

With reference to FIG. 17, illustrated is a system 1700 that facilitates blanking control resources based on a request from an eNB. For example, system 1700 can reside at least partially within a base station, UE, etc. It is to be appreciated that system 1700 is represented as including functional blocks, which can be functional blocks that represent functions implemented by a processor, software, or combination thereof (e.g., firmware). System 1700 includes a logical grouping 1702 of electrical components that can act in conjunction. For instance, logical grouping 1702 can include an electrical component for receiving a downlink control blanking request indicating a set of control resources to be blanked 1704. For example, as described, the downlink control blanking request can explicitly indicate resources (e.g., by frequency and/or time), indicate parameters for determining the resources (e.g., hopping pattern, reuse, or other diversity information), and/or the like. In addition, the downlink control blanking request can be received over a low reuse dedicated channel and/or using diversity to ensure message receipt. Moreover, logical grouping 1702 can include an electrical component for locally blanking the set of control resources where the set of control resources are uplink resources 1706. Additionally, system 1700 can include a memory 1708 that retains instructions for executing functions associated with electrical components 1704 and 1706. While shown as being external to memory 1708, it is to be understood that one or more of electrical components 1704 and 1706 can exist within memory 1708.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
   transmitting, from a subscriber device to one or more interfering devices, a control blanking request for blanking a set of control resources; and
   communicating control information with a disparate device over the set of control resources.

2. The method of claim 1, further comprising selecting the set of control resources from available downlink control resources, wherein transmitting the control blanking request includes sending a control blanking message comprising the control blanking request to the one or more interfering devices.

3. The method of claim 2, further comprising transmitting a disparate control blanking request specifying a set of uplink control resources for blanking to the one or more interfering devices over the set of control resources.

4. The method of claim 3, wherein the control information includes a downlink resource blanking message that comprises a resource blanking request specifying a set of data resources for blanking.

5. The method of claim 4, further comprising communicating data to the disparate device over the set of data resources.

6. The method of claim 3, wherein the control information includes a downlink resource grant for the disparate device.

7. The method of claim 3, further comprising transmitting a pilot signal to the disparate device to receive feedback regarding quality over the set of data resources or the set of control resources.

8. The method of claim 2, further comprising transmitting a resource blanking request that specifies a set of data resources for blanking to the one or more interfering devices.

9. The method of claim 8, further comprising communicating data with the disparate device over the set of data resources.

10. The method of claim 2, further comprising transmitting an uplink grant to the disparate device.

11. The method of claim 2, wherein the control blanking message further includes a key related to a channelization for the set of control resources.

12. The method of claim 11, further comprising generating the key from a pilot identifier and a system time.

13. The method of claim 2, further comprising receiving a pilot indicator signal and determining whether the one or more interfering devices blanks transmission over the set of control resources based at least in part on a pilot signal.

14. The method of claim 2, wherein the control blanking message is sent over a low reuse control channel.

15. The method of claim 14, further comprising transmitting a resource blanking message including a request to blank over a set of data resources over the low reuse control channel.

16. The method of claim 1, further comprising:
   receiving a downlink control blanking message requesting blanking of the set of control resources, where the set of control resources correspond to downlink resources; and
   generating the control blanking request based at least in part on the set of control resources.

17. The method of claim 16, further comprising receiving a downlink resource blanking message requesting blanking of a set of data resources over the set of control resources.

18. The method of claim 17, further comprising:
   generating an uplink data resource blanking request for the set of data resources; and
   transmitting the uplink data resource blanking request to the one or more interfering devices.

19. The method of claim 18, further comprising communicating over the set of data resources.

20. The method of claim 16, wherein the downlink control blanking message is received over a low reuse control channel.

21. The method of claim 16, wherein the downlink control blanking message comprises a key that defines a channelization for the set of control resources.

22. The method of claim 21, wherein the key corresponds to a pilot identifier of a device that transmits the downlink control blanking message and a system time.

23. The method of claim 16, wherein the downlink control blanking message indicates the one or more interfering devices.

24. The method of claim 1, further comprising:
   transmitting a resource blanking request for blanking a set of data resources to the one or more interfering devices along with the control blanking request; and
   communicating with the disparate device over the set of data resources.

25. The method of claim 1, wherein the control blanking request is transmitted as a unicast, broadcast, or multicast transmission.

26. A wireless communications apparatus, comprising:
   at least one processor configured to:
      send, from a subscriber device to one or more interfering devices, a control blanking request to blank a set of control resources; and
      transmit control information over the set of control resources to a disparate device; and
   a memory coupled to the at least one processor.

27. The wireless communications apparatus of claim 26, wherein the at least one processor is further configured to determine the set of control resources from a set of downlink resources and the at least one processor sends the control blanking request to the one or more interfering devices as a portion of a control blanking message.

28. The wireless communications apparatus of claim 27, wherein the at least one processor is further configured to transmit a disparate control blanking request indicating a set of uplink control resources to blank to the one or more interfering devices over the set of control resources.

29. The wireless communications apparatus of claim 28, wherein the control information includes a downlink resource blanking message that comprises a resource blanking request indicating a set of data resources for blanking.

30. The wireless communications apparatus of claim 29, wherein the at least one processor is further configured to communicate data to the disparate device over the set of data resources.

31. The wireless communications apparatus of claim 28, wherein the control information includes a downlink resource grant for the disparate device.

32. The wireless communications apparatus of claim 27, wherein the at least one processor is further configured to communicate a resource blanking request that specifies a set of data resources for blanking to the one or more interfering devices.

33. The wireless communications apparatus of claim 32 wherein the at least one processor is further configured to communicate with the disparate device over the set of data resources.

34. The wireless communications apparatus of claim 27, wherein the at least one processor is further configured to transmit an uplink grant to the disparate device.

35. The wireless communications apparatus of claim 27, wherein the control blanking message further includes a key related to a channelization for the set of control resources.

36. The wireless communications apparatus of claim 27, wherein the at least one processor sends the control blanking message over a low reuse control channel.

37. The wireless communications apparatus of claim 26, wherein the at least one processor is further configured to:
receive a downlink control blanking message requesting blanking of the set of control resources, wherein the set of control resources correspond to downlink resources; and
generate the control blanking request based at least in part on the set of control resources.

38. The wireless communications apparatus of claim 37, wherein the at least one processor is further configured to receive a downlink resource blanking message requesting blanking of a set of data resources over the set of control resources.

39. The wireless communications apparatus of claim 38, wherein the at least one processor is further configured to:
generate an uplink data resource blanking request for the set of data resources; and
send the uplink data resource blanking request to the one or more interfering devices.

40. The wireless communications apparatus of claim 39, wherein the at least one processor is further configured to communicate over the set of data resources.

41. The wireless communications apparatus of claim 26, wherein the at least one processor is further configured to:
transmit a resource blanking request for blanking a set of data resources to the one or more interfering devices along with the control blanking request; and
communicate with the disparate device over the set of data resources.

42. An apparatus, comprising:
means for sending, from a subscriber device to one or more interfering devices, a control blanking request for blanking a set of control resources; and
means for communicating control information with a disparate device over the set of control resources.

43. The apparatus of claim 42, wherein the means for sending the control blanking request selects the set of control resources from a set of downlink control resources and sends the control blanking request within a control blanking message to the one or more interfering devices.

44. The apparatus of claim 43, wherein the means for sending the control blanking request transmits a disparate control blanking request specifying a set of uplink control resources for blanking to the one or more interfering devices.

45. The apparatus of claim 44, wherein the control information includes a downlink resource blanking message that comprises a resource blanking request specifying a set of data resources for blanking.

46. The apparatus of claim 45, further comprising means for communicating data to the disparate device over the set of data resources.

47. The apparatus of claim 45, wherein the means for communicating control information transmits a pilot signal to the disparate device to receive feedback regarding the set of data resources or the set of control resources.

48. The apparatus of claim 44, wherein the control information includes a downlink resource grant for the disparate device.

49. The apparatus of claim 43, further comprising means for transmitting a resource blanking request that specifies a set of data resources for blanking to the one or more interfering devices.

50. The apparatus of claim 49, further comprising means for communicating data with the disparate device over the set of data resources.

51. The apparatus of claim 43, wherein the control information includes an uplink resource grant for the disparate device.

52. The apparatus of claim 43, wherein the control blanking message further includes a key related to a channelization for the set of control resources including hopping pattern.

53. The apparatus of claim 52, further comprising means for generating the key from a pilot identifier and a system time.

54. The apparatus of claim 43, wherein the control blanking message is sent over a low reuse control channel.

55. The apparatus of claim 42, further comprising means for receiving a downlink control blanking message requesting blanking of the set of control resources, where the set of control resources correspond to downlink resources, wherein the means for sending the control blanking request further generates the control blanking request based at least in part on the set of control resources.

56. The apparatus of claim 55, further comprising means for receiving a downlink resource blanking message requesting blanking of a set of data resources over the set of control resources.

57. The apparatus of claim 56, further comprising means for generating an uplink data resource blanking request for the set of data resources and transmitting the uplink data resource blanking request to the one or more interfering devices.

58. The apparatus of claim 57, further comprising means for communicating over the set of data resources.

59. The apparatus of claim 55, wherein the downlink control blanking message is received over a low reuse control channel.

60. The apparatus of claim 55, wherein the downlink control blanking message comprises a key that defines a channelization for the set of control resources including hopping pattern.

61. The apparatus of claim 60, wherein the key corresponds to a pilot identifier of a device that transmits the downlink control blanking message and a system time.

62. The apparatus of claim 55, wherein the downlink control blanking message indicates the one or more interfering devices.

63. The apparatus of claim 42, wherein the means for sending the control blanking request includes a resource blanking request for blanking a set of data resources to the one or more interfering devices along with the control blanking request.

64. The apparatus of claim 42, wherein the control blanking request is transmitted as a unicast, broadcast, or multicast transmission.

65. A computer program product, comprising:
a non-transitory computer-readable medium comprising:
code for causing at least one computer to transmit, from a subscriber device to one or more interfering devices, a control blanking request for blanking a set of control resources; and
code for causing the at least one computer to communicate control information with a disparate device over the set of control resources.

66. The computer program product of claim 65, wherein the computer-readable medium further comprises code for causing the at least one computer to select the set of control resources from available downlink control resources, wherein transmitting the control blanking request includes sending a control blanking message comprising the control blanking request to the one or more interfering devices.

67. The computer program product of claim 66, wherein the computer-readable medium further comprises code for causing the at least one computer to transmit a disparate control blanking request specifying a set of uplink control resources for blanking to the one or more interfering devices over the set of control resources.

68. The computer program product of claim 67, wherein the control information includes a downlink resource blanking message that comprises a resource blanking request specifying a set of data resources for blanking.

69. The computer program product of claim 68, wherein the computer-readable medium further comprises code for causing the at least one computer to communicate data to the disparate device over the set of data resources.

70. The computer program product of claim 67, wherein the control information includes a downlink resource grant for the disparate device.

71. The computer program product of claim 66, wherein the computer-readable medium further comprises code for causing the at least one computer to transmit a resource blanking request that specifies a set of data resources for blanking to the one or more interfering devices.

72. The computer program product of claim 71, wherein the computer-readable medium further comprises code for causing the at least one computer to communicate data with the disparate device over the set of data resources.

73. The computer program product of claim 66, wherein the computer-readable medium further comprises code for causing the at least one computer to transmit an uplink grant to the disparate device.

74. The computer program product of claim 66, wherein the control blanking message further includes a key related to a channelization for the set of control resources.

75. The computer program product of claim 66, wherein the computer-readable medium further comprises:
code for causing the at least one computer to receive a downlink control blanking message requesting blanking of the set of control resources, where the set of control resources correspond to downlink resources; and
code for causing the at least one computer to generate the control blanking request based at least in part on the set of control resources.

76. The computer program product of claim 75, wherein the computer-readable medium further comprises code for causing the at least one computer to receive a downlink resource blanking message requesting blanking of a set of data resources over the set of control resources.

77. The computer program product of claim 76, wherein the computer-readable medium further comprises:
code for causing the at least one computer to generate an uplink data resource blanking request for the set of data resources; and
code for causing the at least one computer to transmit the uplink data resource blanking request to the one or more interfering devices.

78. The computer program product of claim 77, wherein the computer-readable medium further comprises code for causing the at least one computer to communicate over the set of data resources.

79. The computer program product of claim 75, wherein the downlink control blanking message indicates the one or more interfering devices.

80. The computer program product of claim 65, wherein the computer-readable medium further comprises:
code for causing the at least one computer to transmit a resource blanking request for blanking a set of data resources to the one or more interfering devices along with the control blanking request; and
code for causing the at least one computer to communicate with the disparate device over the set of data resources.

81. An apparatus, comprising:
a control blanking request component that sends, from a subscriber device to one or more interfering devices, a control blanking request for blanking a set of control resources; and
a control communication component that transmits or receives control information with a disparate device over the set of control resources.

82. The apparatus of claim 81, wherein the control blanking request component is a control blanking message component that selects the set of control resources from a set of downlink control resources and sends the control blanking request within a control blanking message to the one or more interfering devices.

83. The apparatus of claim 82, wherein the control blanking message component transmits a disparate control blanking request specifying a set of uplink control resources for blanking to the one or more interfering devices.

84. The apparatus of claim 83, wherein the control information includes a downlink resource blanking message that comprises a resource blanking request specifying a set of data resources for blanking.

85. The apparatus of claim 84, further comprising a data communication component that transmits or receives data to the disparate device over the set of data resources.

86. The apparatus of claim 83, wherein the control information includes a downlink resource grant for the disparate device.

87. The apparatus of claim 82, further comprising a resource blanking message component that transmits a resource blanking request specifying a set of data resources for blanking to the one or more interfering devices.

88. The apparatus of claim 87, further comprising a data communication component that transmits or receives data with the disparate device over the set of data resources.

89. The apparatus of claim 82, wherein the control information includes an uplink resource grant for the disparate device.

90. The apparatus of claim 82, wherein the control blanking message further includes a key related to a channelization for the set of control resources including hopping pattern.

91. The apparatus of claim 81, further comprising a message receiving component that obtains a downlink control blanking message requesting blanking of the set of control resources, where the set of control resources correspond to downlink resources, wherein the control blanking request component generates the control blanking request based at least in part on the set of control resources.

92. The apparatus of claim 91, wherein the message receiving component receives a downlink resource blanking message requesting blanking of a set of data resources over the set of control resources.

93. The apparatus of claim 92, further comprising a resource blanking message component that generates an uplink data resource blanking request for the set of data resources and transmits the uplink data resource blanking request to the one or more interfering devices.

94. The apparatus of claim 93, further comprising a data communication component that transmits or receives data over the set of data resources.

95. The apparatus of claim 91, wherein the downlink control blanking message indicates the one or more interfering devices.

96. The apparatus of claim 81, wherein the control blanking request component transmits a resource blanking request for blanking a set of data resources to the one or more interfering devices along with the control blanking request.

97. The method of claim 1, further comprising determining whether control resources for which blanking is requested are blanked.

98. The wireless communications apparatus of claim 26, wherein the at least one processor is further configured to determine whether control resources for which blanking is requested are blanked.

99. The apparatus of claim 42, further includes means for determining whether control resources for which blanking is requested are blanked.

100. The computer program product of claim 65, further including code for causing the at least one computer to determine whether control resources for which blanking is requested are blanked.

101. The apparatus of claim 81, further comprising a data communication component that determines whether control resources for which blanking is requested are blanked.

* * * * *